United States Patent [19]

Borden

Best Available Copy

[11] E Re. 30,340

[45] Reissued Jul. 22, 1980

[54] DENTAL HANDPIECE

[76] Inventor: John V. Borden, 3815 Chanel Rd., Annandale, Va. 22003

[21] Appl. No.: 959,435

[22] Filed: Nov. 9, 1978

Related U.S. Patent Documents

Reissue of:

[64] Patent No.: 3,324,553
Issued: Jun. 13, 1967
Appl. No.: 679,552
Filed: Aug. 22, 1957

U.S. Applications:

[63] Continuation-in-part of Ser. No. 634,860, Jan. 18, 1957, abandoned.

[51] Int. Cl.[2] ..... A61C 1/10

[52] U.S. Cl. ..... 433/126; 433/127; 433/132

[58] Field of Search ..... 32/26, 27

[56] References Cited

U.S. PATENT DOCUMENTS

| | | | |
|---|---|---|---|
| 1,878,747 | 9/1932 | Youngblood | 252/3 |
| 2,090,885 | 8/1937 | Clark | 32/27 |
| 2,180,993 | 11/1939 | Monnier | 253/2 |
| 2,231,393 | 2/1941 | Mulvany | 32/28 |
| 2,283,314 | 5/1942 | Ckola | 15/24 |
| 2,606,366 | 8/1952 | Stevens | 32/48 |
| 2,671,700 | 3/1954 | Seyffert | 32/26 |
| 2,716,982 | 9/1955 | Ryan | 128/214 |
| 2,799,934 | 7/1957 | Kern | 32/27 |
| 2,871,562 | 2/1959 | Kern | 32/27 |

FOREIGN PATENT DOCUMENTS

| | | |
|---|---|---|
| 163217 | 6/1949 | Austria . |
| 418099 | 2/1937 | Italy . |

OTHER PUBLICATIONS

New Zealand Patent Office Journal, May 23, 1951, Publication of Abstract of New Zealand Patent bearing Nos. 102,433, and 104,611.

*Primary Examiner*—Robert Peshock
*Attorney, Agent, or Firm*—C. Hercus Just; Arnold B. Christen

[57] ABSTRACT

*A dental handpiece comprises an air driven turbine rotor provided with a chuck to removably hold a dental bur and rotate it at extremely high speed. The rotor is mounted on anti-friction bearings within a capsule which is removably received within a housing to permit replacement of the capsule and turbine as a unit. The fluid outlet from the turbine is restricted sufficiently to ensure that a portion of the fluid is exhausted through the bearings and openings in the housing to prevent egress of foreign matter into the interior.*

56 Claims, 28 Drawing Figures

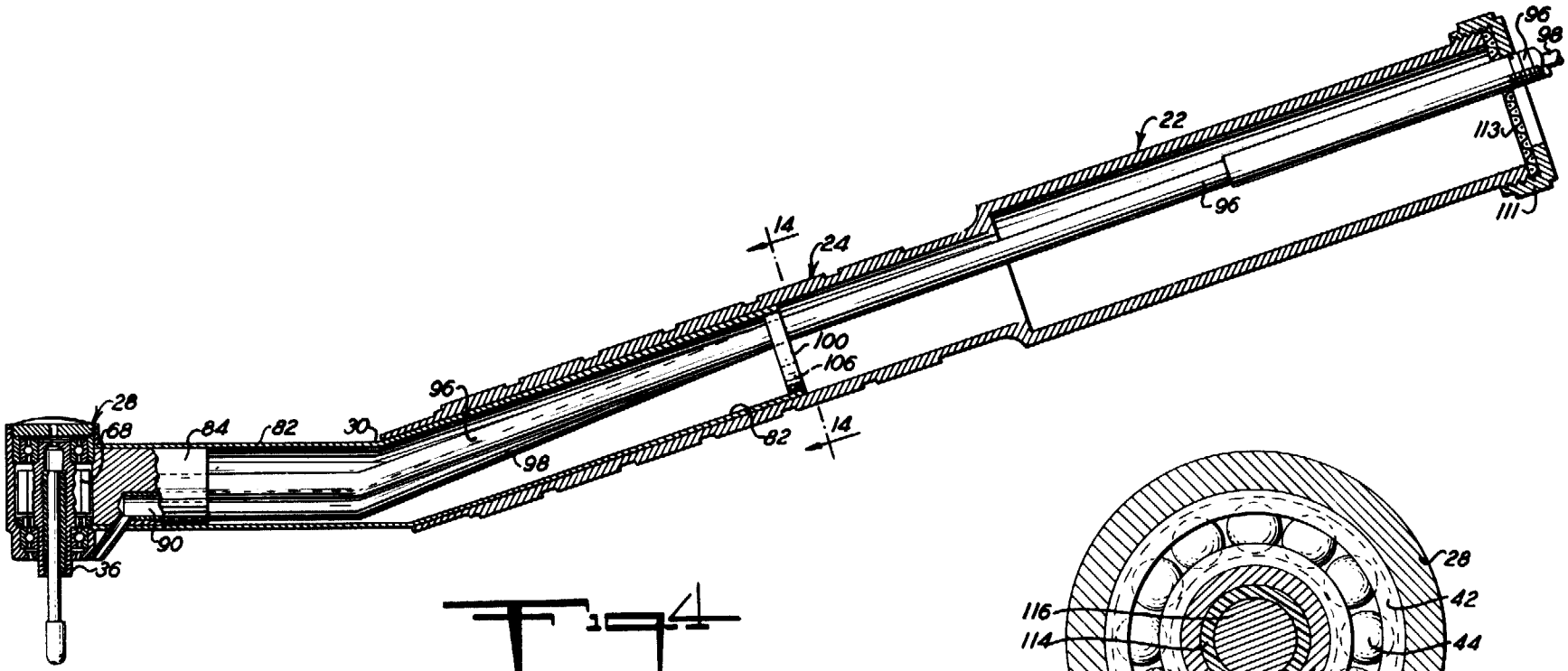
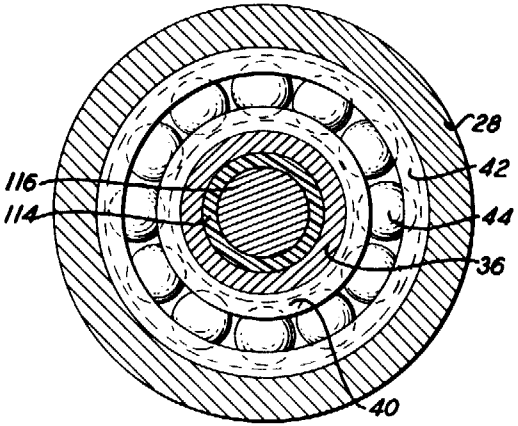
FIG. 7
FIG. 4

DENTAL HANDPIECE

Matter enclosed in heavy brackets [ ] appears in the original patent but forms no part of this reissue specification; matter printed in italics indicates the additions made by reissue.

This application is continuation-in-part of pending application, Ser. No. 634,860, filed Jan. 18, 1957, now abandoned.

This invention relates to a high speed fluid driven motor, and more particularly to a high speed dental handpiece driven preferably by air.

There has been considerable work in recent years in the dental field to develop a handpiece which would operate at high speeds substantially without vibration.

Handpieces today normally are driven by an electric motor through a system of cables and gears. In addition to the disadvantage of running at comparatively low speeds, a mechanical connection between the electric motor and the bur develops a most undesirable vibration, resulting in trauma to the patient.

Recently work has been undertaken in the dental field with handpieces utilizing a turbine driven by water or air. While operable devices have been developed, they have fallen short of meeting the requirements of practice. One of the principal disadvantages of these prior developments is a requirement for a fluid pressure greater than that normally found in the dentist's office. Water driven turbines have required greater pressure than is found at the tap in the dentist's office and air driven turbines require a pressure greatly in excess of 20 to 30 pounds which is normally found in the dentist's office.

Additionally, prior handpieces of the turbine type have been too bulky for convenient operation in a patient's mouth and speeds in excess of 100,000 r.p.m. are not known to have been obtained.

The present inventor has developed a high speed air turbine handpiece which overcomes the disadvantages found in prior art. Speeds in excess of 100,000 r.p.m. have been attained by a miniature turbine mounted in a housing substantially one-half inch long and less than ⅜ of an inch outside diameter.

It is impossible to say whether one feature of this design contributes more than the others toward the successful operation of the invention. Experimentation on successful models has demonstrated that importance is attached to all of the features.

The essence of the invention, to which all features appear to contribute, resides in mounting the turbine and bearings in such a manner that the gas which drives the turbine forms, in effect, an air bearing at high speeds. In accordance with the invention, the turbine will, at low speeds, be permitted to rotate by virtue of the anti-friction elements in the bearings and at high speeds, the air seems to surround the anti-friction elements so that the turbine is actually supported by air.

An object of the invention is to mount a turbine in a housing in so-called "sloppy" bearings, that is, bearings in which the anti-friction elements are spaceable from their respective races and from each other so that it is possible to form a cushion of air supporting the turbine.

It is another object of the invention to utilize radial bearings for the support of the turbine and to make provision for the passing of air exhausting from the ends of the turbine rotor through the radial bearings for cooling and lubrication purposes.

It is again another object of the invention to provide a turbine having axially aligned vanes, the turbine being mounted in a housing in radial bearings which form with the housing an annular pocket surrounding the peripheral portion of the turbine blades. This annular pocket serves to confine the air among the turbine vanes while permitting the air to expand and assist in driving the vanes.

It is yet another object of the invention to locate the bearings with respect to the rotary vanes so that the roots of the vanes are axially aligned with the anti-friction elements of the bearings, thereby developing columns of air spilling from between the ends of the vanes in the area of the roots and immediately engaging the anti-friction elements of the bearings.

It is another object of the invention to provide a fluid turbine mounted in the manner described having an air inlet arranged to direct a jet of air tangentially against the turbine vanes at a location equally spaced from the ends of the vanes and to provide an exhaust for the air adjacent the air inlet so that the air travels substantially completely around the turbine housing before exhausting.

It is still another object of the invention to provide a turbine of the type described above in which the exhaust outlet adjacent the inlet communicates with a hollow handle upon which said turbine housing is mounted. The exhausting of air through the handle keeps a large portion of the air out of the patient's mouth and, by forming a construction in the handle, a back pressure is developed which serves to assist in floating the bearings, especially at pressures below the highest operable pressures.

It is a further object of the invention to provide a turbine rotor and anti-friction bearing assembly which is arranged as a cartridge unit, preferably at the factory, said cartridge unit including spacing means extending between the outer races of the respective bearings at the opposite ends of the rotor, said cartridge unit being insertable within and removable from the housing of the head of the handpiece in such manner that when the cartridge unit is mounted within the housing and clamped in operative portion therein, the outer races particularly of the anti-friction bearings will be spaced axially apart a precise, predetermined distance by the spacing means of the cartridge unit.

Still another object of the invention is to provide a turbine rotor and anti-friction bearing cartridge unit which may be mounted within and removed from the housing of the handpiece quickly and with a minimum of effort, the securing of the cartridge unit within the housing of the handpiece also being achieved by simple means which will insure accuracy of positioning of the cartridge unit within the housing incident to clamping the same therein in operative position.

A still further object of the invention is to provide a turbine rotor and anti-friction bearing assembly having upper and lower anti-friction bearing units which assembly is receivable readily within a seat in the housing of the handpiece against which the outer race of the lower anti-friction bearing is disposed, while a cap or cover for the housing interengages the outer race of the upper bearing when the unit is clamped within the housing, such clamping insuring the engagement of the outer races of the unit with the spacing means thereof, whereby accurate, predetermined axial spacing of the outer races is insured when the unit is clamped within the housing so as to permit desired lateral play between the inner and outer races of the bearings and the anti-friction members thereof during the operation of the handpiece so as to permit the anti-friction members to be cushioned on gaseous fluid, especially when operating at the higher contemplated speeds.

Still another object of the invention is to provide indexing means by which the turbine rotor and anti-friction bearing cartridge unit are positioned accurately relative to the housing of the handpiece in order that inlet and outlet ports for gaseous fluid passing through the handle of the handpiece to the aforementioned cartridge unit in the head thereof will be aligned accurately with inlet and outlet ports formed in the rotor and anti-friction bearing cartridge unit within the housing.

Yet a further object of the invention is to provide a turbine rotor assembly comprising anti-friction bearing units at opposite ends of a vaned rotor, the inner races of said bearing units being pressed-fitted to opposite ends of the rotor shaft, and the outer races of said bearing units being spaced axially, when the rotor assembly is mounted operatively within the housing of the handpiece, by a casing surrounding the vanes of the rotor and extending axially between said outer races; the raceways for the anti-friction bearings within said inner and outer races of each bearing unit respectively being within common planes transverse to the axis of said rotor when the assembly is operatively positioned within said housing, whereby said anti-friction bearing members within said raceways are spaceable from each other and from said raceways when fluid under sufficient pressure exits within said bearing units to cause said rotor to obtain the velocity necessary to float while rotating.

It is yet another object of the invention to provide orifices in the housing at the end in which the bur is mounted, the orifices serving to direct a portion of the exhaust air against the bur to cool the same.

It is still another object of the invention to provide a bur chuck consisting of a plastic insert mounted in a threaded bore in the turbine, the inside diameter of the insert being slightly less than the outside diameter of the bur to be held so that the bur forces the plastic insert into engagement with the threads in the turbine bore.

It is another object of the invention to provide a bur chuck of the type described in which the bur chuck has a hole in the top through which air will exhaust when a bur is being pushed into position and also through which particles accumulating in the chuck will be aspirated by the passage of air around the top of the chuck.

Other objects of the invention will become more readily apparent from the following detailed description taken in conjunction with the accompanying drawings in which FIG. 1 is a side elevation of a dental handpiece embodying the principles of the invention.

FIG. 4 is a longitudinal vertical sectional view of the handpiece shown in FIG. 1.

FIG. 7 is a horizontal sectional view of the head of the handpiece taken on the line 7—7 of FIG. 5.

Figure 15:
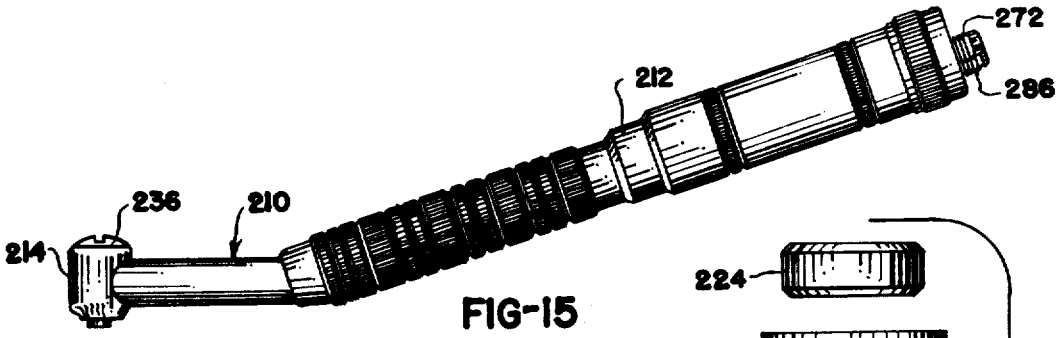
FIG. 15 is a side elevation of an exemplary dental handpiece embodying the principles of the present invention, said handpiece being illustrated approximately in full scale of such handpiece in order to afford an appreciation of the relatively small size of head on said handpiece.
Figure 16:
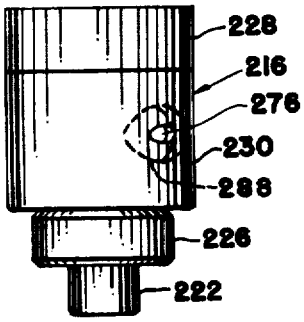

FIG. 16 is a side elevation of the turbine rotor and anti-friction bearing assembly comprising one embodiment cartridge unit assembly thereof for the handpiece comprising the present invention, said cartridge unit assembly being insertable within and removable from the head of the handpiece readily with a minimum of effort and operating procedures, the scale used in this figure being substantially larger than that employed in FIG. 15.

Figure 17:
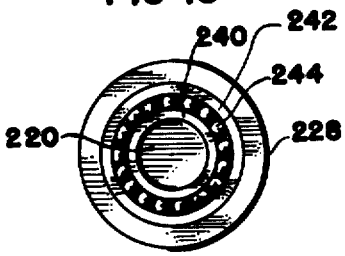

FIG. 17 is a top plane view of the cartridge unit assembly shown in FIG. 16.

Figure 18:
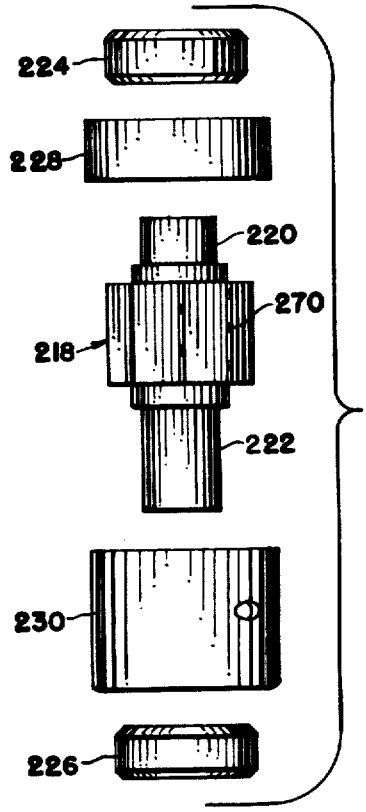

FIG. 18 is an exploded side elevation showing all of the components of the cartridge unit assembly shown in FIGS. 15 and 16 prior to the same being assembled.

Figure 1:
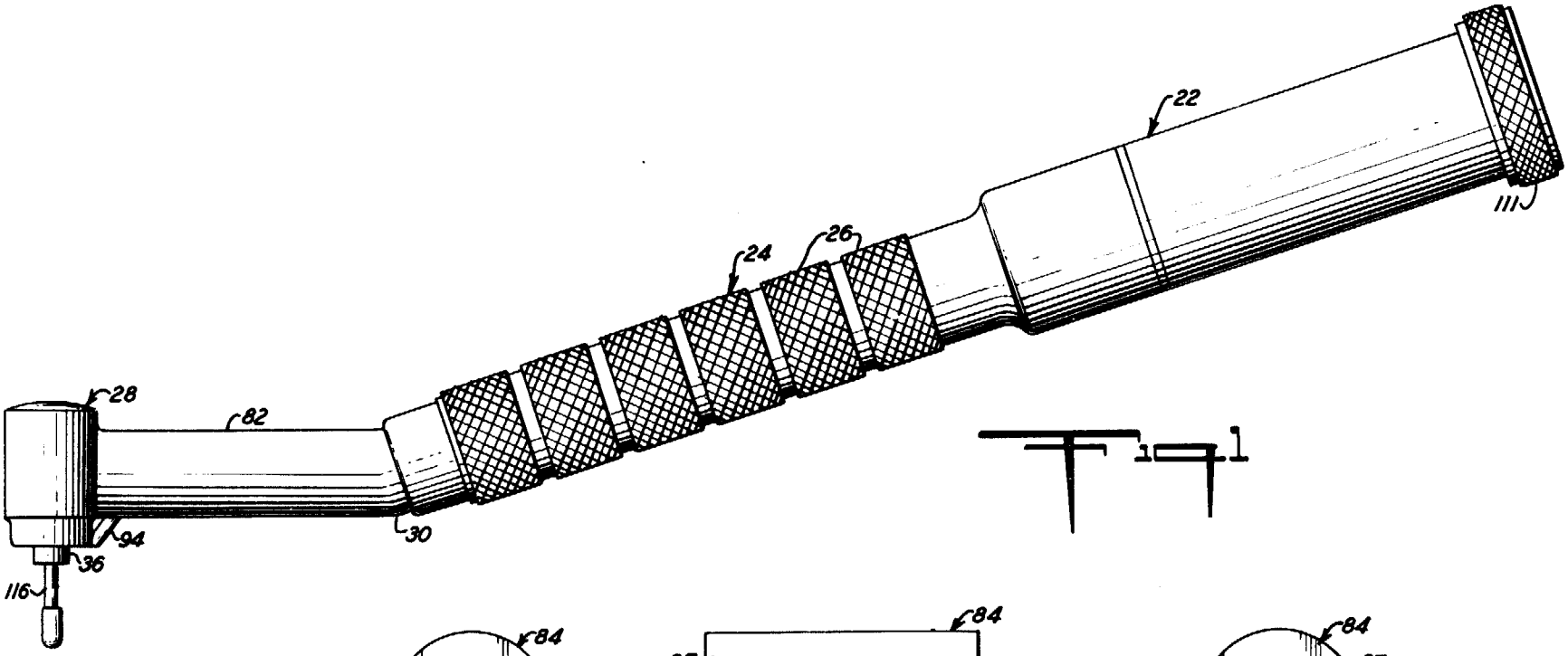
Figure 19:
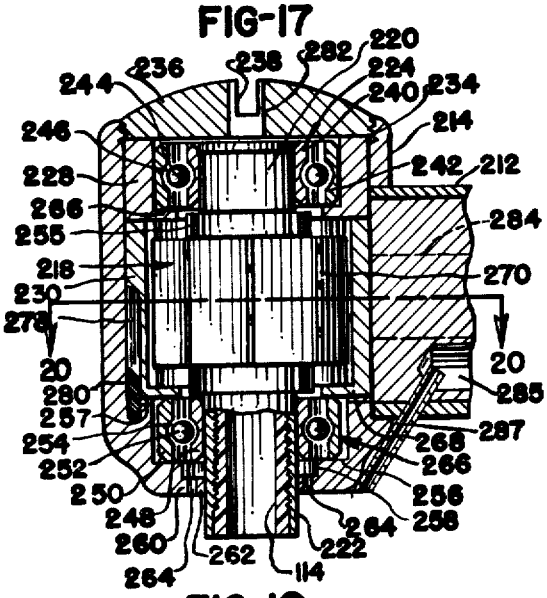

FIG. 19 is a vertical sectional elevation of the head of the handpiece shown in FIG. 1 with most of the handle broken away to facilitate concise illustration, the scale used in FIG. 19 being even larger than that employed in FIGS. 15 and 18.

Figure 20:
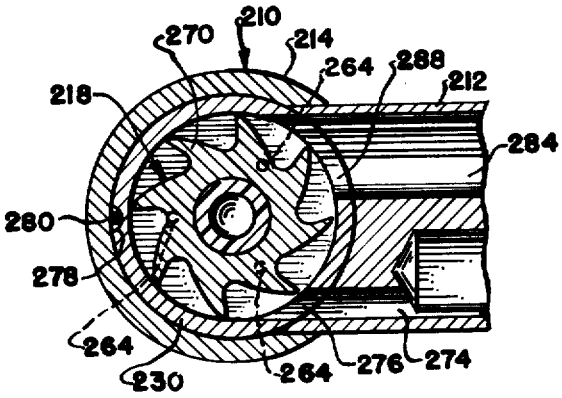

FIG. 20 is a horizontal sectional view of the head portion of the handpiece shown in FIG. 19 as viewed on line 20—20 of FIG. 19.

Figure 21:
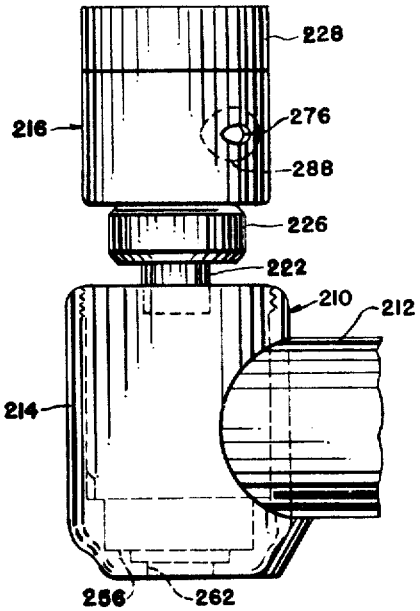

FIG. 21 is a somewhat exploded view of the portion of the handpiece shown in FIGS. 19 and 20 with the cartridge unit assembly shown in the process of being inserted within the housing of the handpiece, the cap not being illustrated in this figure.

Figure 22:
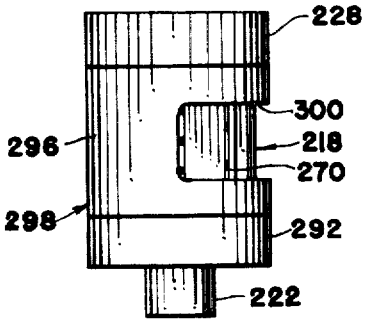

FIG. 22 is a view similar to FIG. 16 but illustrating another embodiment of turbine rotor and bearing cartridge assembly in which the principles of the present invention are incorporated.

Figure 23:
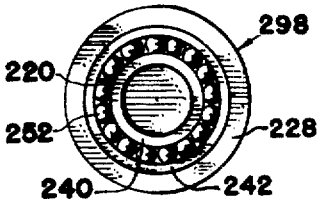

FIG. 23 is a top plan view of the unit shown in FIG. 22.

Figure 24:
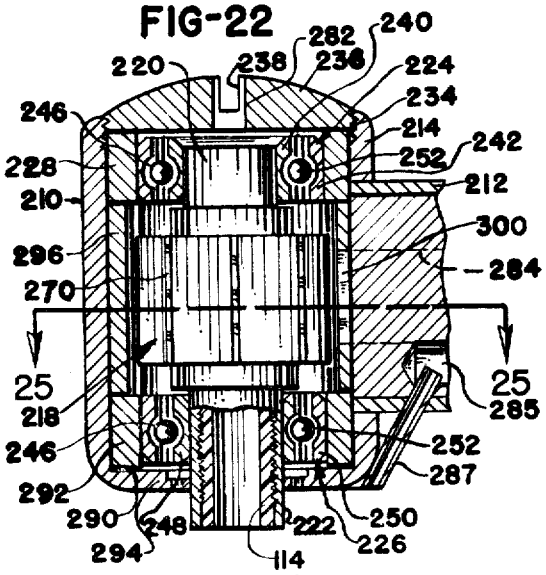

FIG. 24 is a view similar to FIG. 19 but comprises a vertical sectional view of the fragmentary head end of the handpiece in which is mounted the embodiment of the turbine rotor and bearing cartridge assembly shown in FIGS. 22 and 23.

Figure 25:
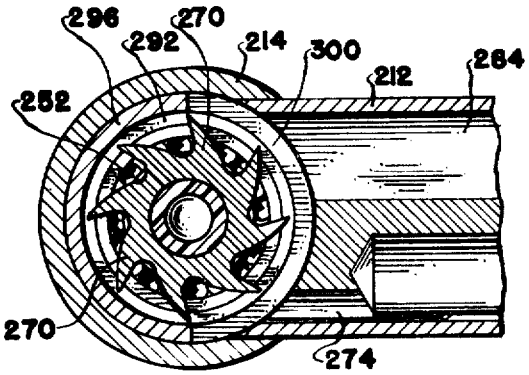

FIG. 25 is a horizontal sectional view of the fragmentary head end of the handpiece shown in FIG. 24 as viewed on the line 25—25 of FIG. 24.

Figure 26:
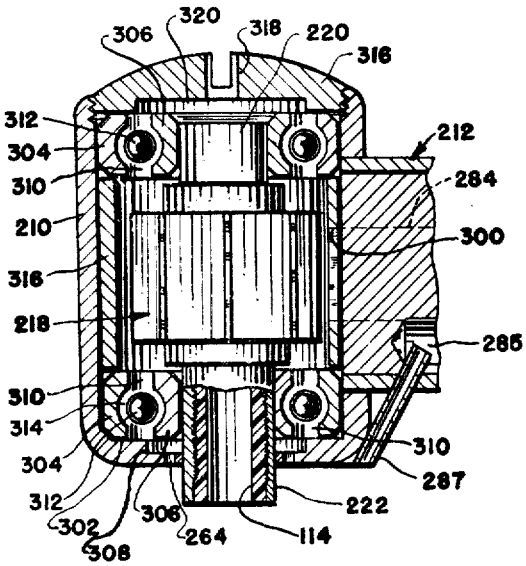

FIG. 26 is a sectional view similar to FIG. 24 but illustrating still another embodiment of turbine rotor and bearing cartridge assembly constructed in accordance with the principles of the present invention.

Figure 27:
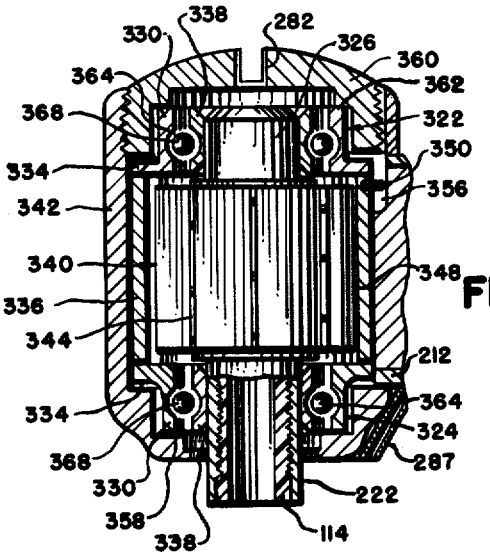
Figure 28:
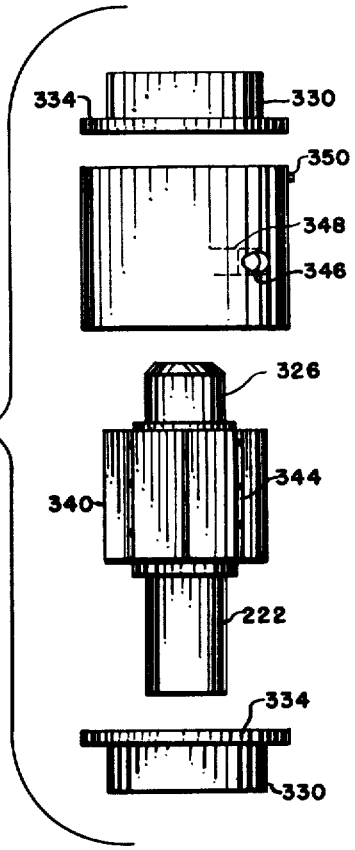

FIGS. 27 and 28, respectively, are vertical sectional and vertical exploded views showing a still further embodiment of turbine rotor and bearing cartridge assembly embodying the principles of the invention.

Referring to the drawings, the handpiece 22 consists of a handle 24 knurled for convenience at 26 and having a head or turbine housing 28 attached to the end thereof. The end of the handle is formed with a bend at 30 as is customary in contra-angled handpieces.

Turbine and housing construction

The head 28 has a substantially cylindrical recess or bore 32 terminating at the lower end thereof in a hole 34 through which the normally lower end of a turbine spindle or shaft 36 projects. The normally lower end of the turbine spindle or shaft 36 is rotatably supported by an anti-friction lower bearing 38 having an inner race 40, an outer race 42 and loosely held anti-friction members such as balls 44. The lower end of shaft 36 is slidably and frictionally received within inner race 40. The outer race of the bearing is seated on a shoulder 46 within head 28 and is held in place on said shoulder by a clamping ring or washer 48 which is threaded into the recess 32 at 50, a slight clearance 51 being provided on the lower end of head 28 below inner race 40. In a handpiece which has been used successfully under all types of dental drilling, the outer diameter of race 42 is ¼ inch, the inner race has an inner diameter of ⅛ inch, the diameter of the 15 balls is 1 mm. each, and there is between 0.003" and 0.005" lateral movement possible between the races diametrically. The height of both races is approximately 3/32 inch.

At the upper end of spindle 36 a normally upper bearing 52 has its inner race 54 press-fitted on the upper end of shaft 36. The upper bearing has a set of loosely fitting anti-friction balls 56 and an outer race 58 to which is press-fitted a spacer ring or collar 60 of slightly greater height than the bearing races, the upper end of ring 60 extending above the bearing races to provide a clearance 61 for the inner race 54. In general, bearings 38 and 52 are similar.

A cap 62 preferably having a threaded engagement 64 with the recess 32 locks the spacer ring 60 against annular shoulder 66 to hold the assembled bearing 52 and shaft 36 in place, as well as to close the upper end of recess 32.

Figure 6:
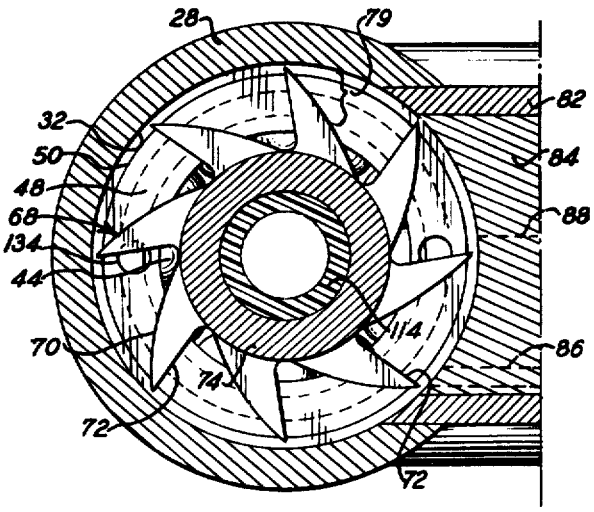
FIG. 6 is a horizontal sectional view of the head of the handpiece taken on the line 6—6 of FIG. 5 and illustrating particularly the relationship of the root portions of the spaces between the turbine blades to the anti-friction members of the bearings, as well as the annular space within which the peripheral portions of the turbine blades operate.
Figure 8:
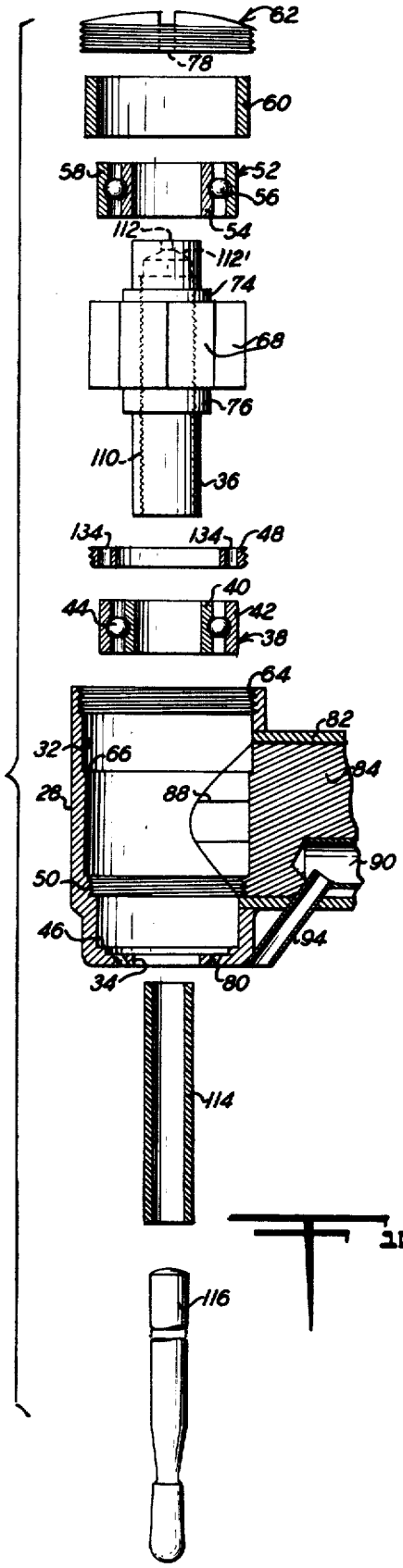
FIG. 8 is a vertical exploded view of the head of the handpiece shown in FIG. 5, certain of the parts being in vertical section.
Figure 14:
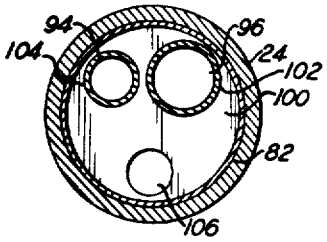
FIG. 14 is a vertical sectional elevation taken on line 14—14 of FIG. 4 and showing the rear end of the constricting disc in the handle 24.

Integral with the shaft 36 is a turbine rotor comprising axially and radially extending vanes or blades 68. As best shown in FIG. 6, said vanes are curved at the leading surface 70 and have a flat trailing surface 72. In the preferred embodiment of the invention, the shaft 36 and turbine may be formed integrally from suitable stock such as metal of non-corrosive nature and the diameter of the turbine from blade tip to opposite blade tip in handpieces used successfully is 0.279 inch, the radius of curvature of the leading surface being 0.172 inch. The flat surface 72 is inclined approximately 12½ degrees to the diameter. It has been found that a turbine proportioned as indicated above permits incoming gas to impinge and expand against the flat surface 72 to give a maximum component of force driving the turbine about its axis of rotation.

It should be noted particularly from FIG. 6 that the roots of the vanes 68 and the apexes of the spaces therebetween are substantially in axial alignment with the anti-friction members such as balls 44 and 56. It is believed that through this arrangement, columns of gas are spilled under pressure in an axial direction from the ends of the apexes of said spaces between the blades and directly wash against the balls 44 and 56 of the bearings and assists in both cooling and cushioning the bearing components, such cushioning action being described in greater detail hereinafter.

Integral with the shaft and at opposite ends of the turbine vanes are an upper collar 74 and a lower collar 76. These collars serve to space the bearings 52 and 38 respectively a precise distance from the upper and lower ends of the turbine blades. Since the clamping washer 48 is precisely machined, it too preferably is spaced precisely from the lower end of the turbine blades 68. In the preferred embodiment of the invention, an annular shield member 77, shown in FIG. 5, which may be integral with the lower end of spacer ring 60, is held in precisely spaced relationship to the upper ends of blades 68. The perimeters of the central openings in shield member 77 and clamping washer 48 preferably substantially are in axial alignment with the centers of the anti-friction members 44 and 56 for purposes to be described.

There appears to be a certain amount of criticality attached to the spaces immediately above and below the turbine blades 68 relative to shield member 77 and clamping washer 48 respectively. In a motor of the size described, spaces should be within a range of from 0.005 to 0.025 inch. If the spaces are too small, a condition is created which interferes with the proper flow of the driving gas through the bearings, insufficient cooling results, and a siren-like noise is produced, while if the space is too large, insufficient torque results and the overall length of the assembly is increased, thus defeating the object of producing a turbine motor of minimum size, particularly for intra-oral dental use.

It should be observed that in the construction thus far described, approximately the outer half of the turbine blades are confined in an annular pocket or chamber 79 defined by the inner cylindrical surface of the recess 32, the upper surface of the clamping washer 48, and the lower surface of the shield member 77. This annular pocket 79 serves to confine the outer or peripheral portions of blades 68 and the gas impinging and expanding thereagainst so that the greater part of the force developed by the gas during such expansion is applied to the turbine blades to produce driving torque in shaft 36.

Due to the shape of the grooves or notches between blades 68 and somewhat tangential inclination thereof, it is believed that expansion of the gas within said spaces results in force components tending to drive the turbine rotor forwardly. Further, the only escape of such gas from the annular cavity 79 is at opposite ends thereof through the restricted annular openings respectively between the perimeters of the central openings in shield 77 and washer 48 and collars 74 and 76. Such restricted annular discharge passages are believed to at least partially afford a floating action between the anti-friction members and races of each bearing, as well as between the anti-friction members per se, when the turbine is operated under preferred conditions of gas pressure.

Since the apexes of the spaces between the blades 68 are substantially axially aligned with the anti-friction members of each bearing and the turbine rotor moves in its rotary path twice as fast as the anti-friction members move in theirs, the anti-friction members constantly will be swept by a series of gas blasts discharging from the opposite ends of said spaces respectively through the spaces between the race of the bearings. It is believed that this series of blasts also tends to separate the anti-friction members of each bearing from each other.

The amount of torque produced and smoothness of operation appears to be improved when such constricting outlets as are provided by shield 77 and washer 48 are used as compared with when they are not used.

The cap 62 is provided with one or more gas exhaust holes 78. Such hole permits the gas discharging from the upper end of the annular space 79 to pass between outer race 58 and inner race 54 of the upper bearing 52 and out through said exhaust hole 78. Several advantages result from the arrangement in that the cooling and floating of the bearings is facilitated and it appears that the flow of gas in this manner decreases the turbulence of the gas inside the housing. An additional, aspirating advantage, to be described hereinafter, also results.

In the lower end of the housing a plurality of gas discharge ports 80 (preferably three) are circumferentially spaced evenly around the lower end of shaft 36 to insure passage of exhaust gas between the races 40 and 42 of lower bearing 38 and past anti-friction members 44, in the manner and with the effect described in connection with the hole 78 in cap 62 relative to upper bearing 52. Additionally, the ports 80 are inclined slightly toward the axis of shaft 36 so as to direct exhausting air against the tip of a bur which normally is carried by the lower end of the turbine spindle.

Handle construction

Referring to FIGS. 4, 5, 8 and 10, a portion of the handle adjacent the turbine housing consists of a thin metal tube 82 having a neck block 84 inserted tightly and fixedly in the terminal end thereof. The neck block has an axially extending bore 86, the outer end of which serves as a nozzle to direct a jet of gas continuously and tangentially against the outer portions of the turbine blades 68 when the turbine is operating. It should be noted that the bore 86 is arranged to direct the jet of gas to impinge against faces 72 of blades 68 substantially at the tangential angle shown in FIG. 6 relative to the axis of the turbine rotor and substantially midway of the ends of the turbine blades so that the gas is discharged substantially equally from opposite ends of the spaces between the blades and through the bearings. The center of the gas stream is inward from the circular path described by the tips of blades 68, whereby the stream expands in all directions against the faces 72 of the blades upon contacting the same, thereby affording maximum torque delivery by the turbine rotor.

Figure 12:
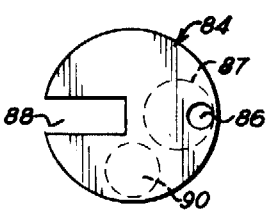
FIG. 12 is front end view of the neck block shown in FIG. 10.
Figure 10:
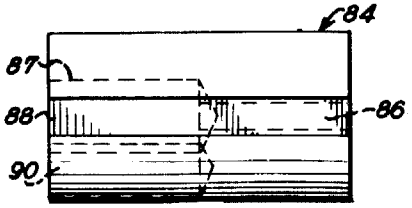
FIG. 10 is a side elevation of a neck block used within the head end of the handle of the handpiece.
Figure 11:
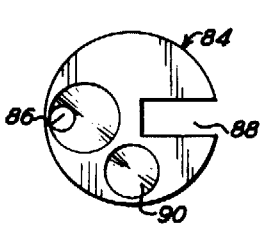
FIG. 11 is a rear end view of the neck block shown in FIG. 10.
Figure 2:
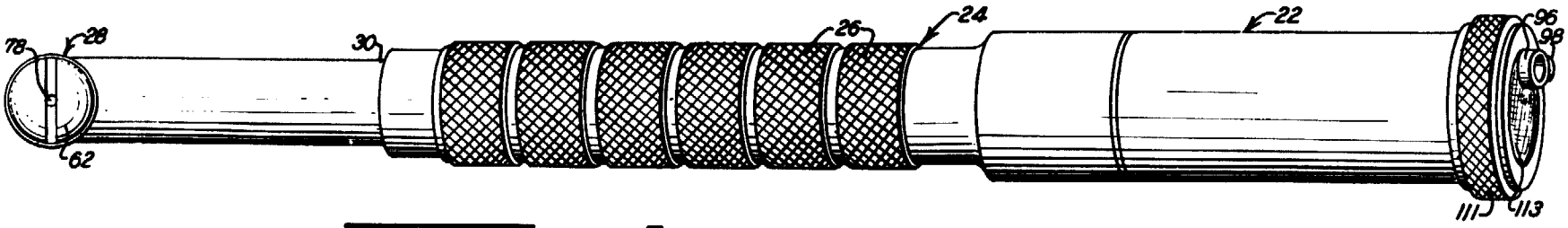
FIG. 2 is a top plan view of the dental handpiece shown in FIG. 1.
Figure 3:
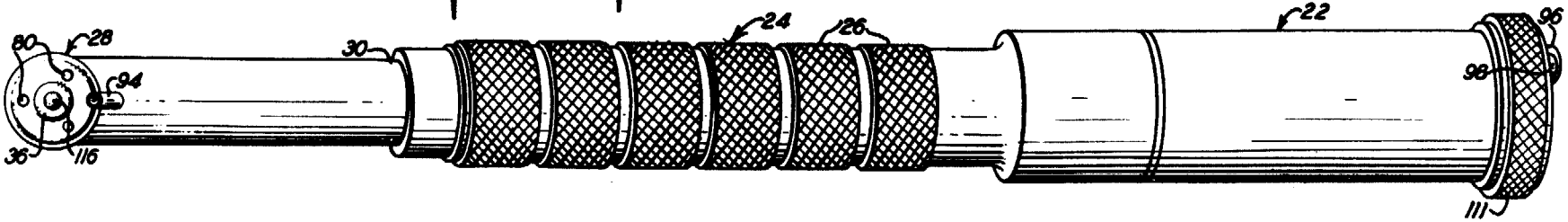
FIG. 3 is a bottom plan view of the dental handpiece shown in FIG. 1.

A slot 88 is formed in the neck block on the diametrically opposite side thereof from bore 86 for exhausting gas from the turbine housing radially into the handle. As will be seen from FIG. 12 especially, the slot 88 is of substantially greater cross-sectional area than bore 86, whereby the pressure of the gas discharging into recess 32 readily can expand therein and the expanded gas is exhausted from recess 32 principally through slot 88, although some exits through hole 78 in the cap and holes 80 in housing 28.

It should be observed that with the spacing of the inlet bore 86 and outlet slot 88, the gas travels a little less than 360° around the housing before it exhausts, so that, as much as possible, the energy contained in the expanding gas within the housing is utilized in driving the turbine before the gas is exhausted.

The neck block has an additional bore 90 which does not extend completely through the neck block to annular cavity 79 but communicates at its forward end with an inclined bore 92 and sleeve 94 (see FIG. 5) for the passage of water to be directed against the bur. Neck block 84 has a bore 87 extending inward from the rear end which is larger than gas outlet bore 86 and communicates therewith. Tubes 96 and 98 are brazed respectively into bores 87 and 90 respectively for connection to the supplies of gas and water respectively, the outer ends of said tubes extending to or through the rear end of the handle 22 for connection to flexible tubes by which the gas and water is fed to said tubes respectively.

The tube 82, at a location spaced outwardly from the neck block, is fitted with a disc 100 having holes 102 and 104 through which the water and air tubes 94 and 96 extend. The perimeters of said holes tightly engage the outer surfaces of said tubes, whereby a gas chamber is provided within which the discharging gas is maintained at a predetermined pressure of between one and five pounds in the size of handpiece and turbine specifically described herein, depending upon the pressure of the gas fed to the handpiece in accordance with the graph shown in FIG. 9, which is described in detail hereinafter. An additional hole 106 serves as a constricting exhaust port of approximately 0.0465 inch diameter for the overall size of handpiece described herein when using pressures illustrated on the graph in FIG. 9.

It can be seen that the gas exhausting from the housing through exhaust port or slot 88 in the neck block 84 will have to pass through the exhaust port 106 in disc 100 and through the constricting effect of the port 106, a back pressure is created within said gas chamber in tube 82 which has an important effect upon the operation of the turbine. While the precise effect is not known, it has been observed that too great a pressure noticeably slows the turbine down. If there is substantially no pressure, that is, if the gas exhausts freely, excessive inlet pressures are required to produce a desired speed.

Figure 9:
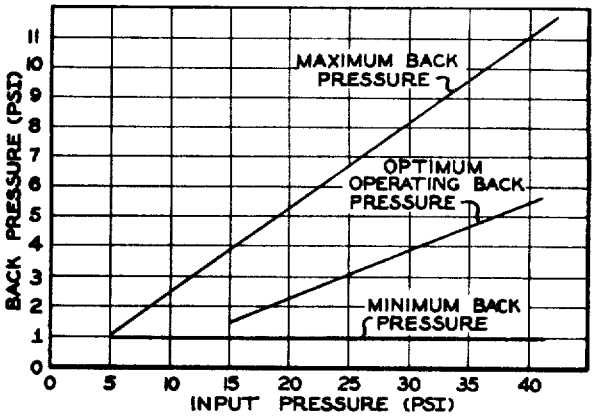
FIG. 9 is a graph illustrating ranges of operable limits of back pressures within the head of the handpiece produced by input pressures, the preferred range of back pressures relative to input pressure also being shown.

It has been found that the constricted port 106 should be of such size that the back pressure bears the relation to the incoming pressure illustrated in the curves shown in FIG. 9. The curves shown in FIG. 9 have been prepared from recorded data resulting from actual operation of handpieces of the size described above and using bearings of the sizes described herein. Also, the inlet port 86 is approximately 0.0465 inch in diameter, hole 78 in cap 62 is approximately 1/32 inch diameter, the three holes 80 are each approximately 0.021 inch diameter, and the difference in diameters between the socket end of shaft 36 and holes 34 in housing 28 for said shank is approximately 0.0032 inch. All of these holes, port, and annular space around the socket end of shaft 36 are openings through which gas is exhausted in addition to being exhausted principally through constricted opening 106.

Referring to FIG. 9, it will be seen that not only are curves shown representing respectively maximum and minimum back pressures within recess 32 within head 28, but a preferred or optimum range of back pressures are shown by a curve so identified. Back pressures falling within the maximum and minimum curves will permit reasonably satisfactory operation of the handpiece but the preferred range of back pressures, relative to input pressure, produce the best operating conditions with respect to speed, torque, quietness, and freedom from vibration as well as substantially no trauma to the patient. Further, it will be seen that the range of input pressures is regarded as so-called low pressures and are found commonly in any dental office. Hence, normal air supply presently available is all that is required, no extra compressors or high pressure compressors being necessary.

In practice, the handle portion as shown in FIGS. 1 through 4 is separately formed with the outlet end of neck block 84 having a substantially plane surface. The neck block and tube 82 are then brazed together with the inner end of the block extending approximately half way into the housing. The housing is thereafter bored and reamed to form the various cylindrical sections of different diameters illustrated in FIGS. 5 and 8, certain of these cylindrical sections then being threaded to receive respectively the clamping washer 48 and cap 62. The outer end portion of handle 24 preferably has a larger diameter than tube 82, with which it is connected, and the outer end is open. A finishing and clamping ring 111 is threaded onto the outer end of the handle, clamping filtering means such as a non-corrosive wire mesh disc 113 or the like against the end of the handle. Tubes 96 and 98 extend through openings in said filtering means for the inlet of water and gas. The function of screen 113 and/or filter packing 113[1] is to filter, trap and deposit lubricant mist within the handle and to muffle any high pitched sound emanating from the turbine. If preferred, in lieu of or in addition to screen 113, the outer end of handle 22 may be packed with non-corrosive wire gauze or metal wool to enhance the filtering function.

Additional operational members

In addition to the handle and turbine housing described above, the handpiece, which is provided with connections to water and gas, preferably air, under pressure, as described above, may be controlled by separate valves conveniently operated by the dentist's foot or by hand, on a control box for example, these valves being provided for selectively introducing air to drive the turbine, or for introducing water, or for introducing both water and air simultaneously. Included in an operating unit for said handpiece is a device designed for injecting a fog or vapor of oil into the air before it passes into the turbine housing, thereby automatically introducing a very light supply of the oil to the bearings as the exhaust air from the turbine passes through said bearings. One example of such operating or control unit comprises the subject matter of co-pending application Ser. No. 666,454, filed June 18, 1957.

Chuck design

Figure 5:
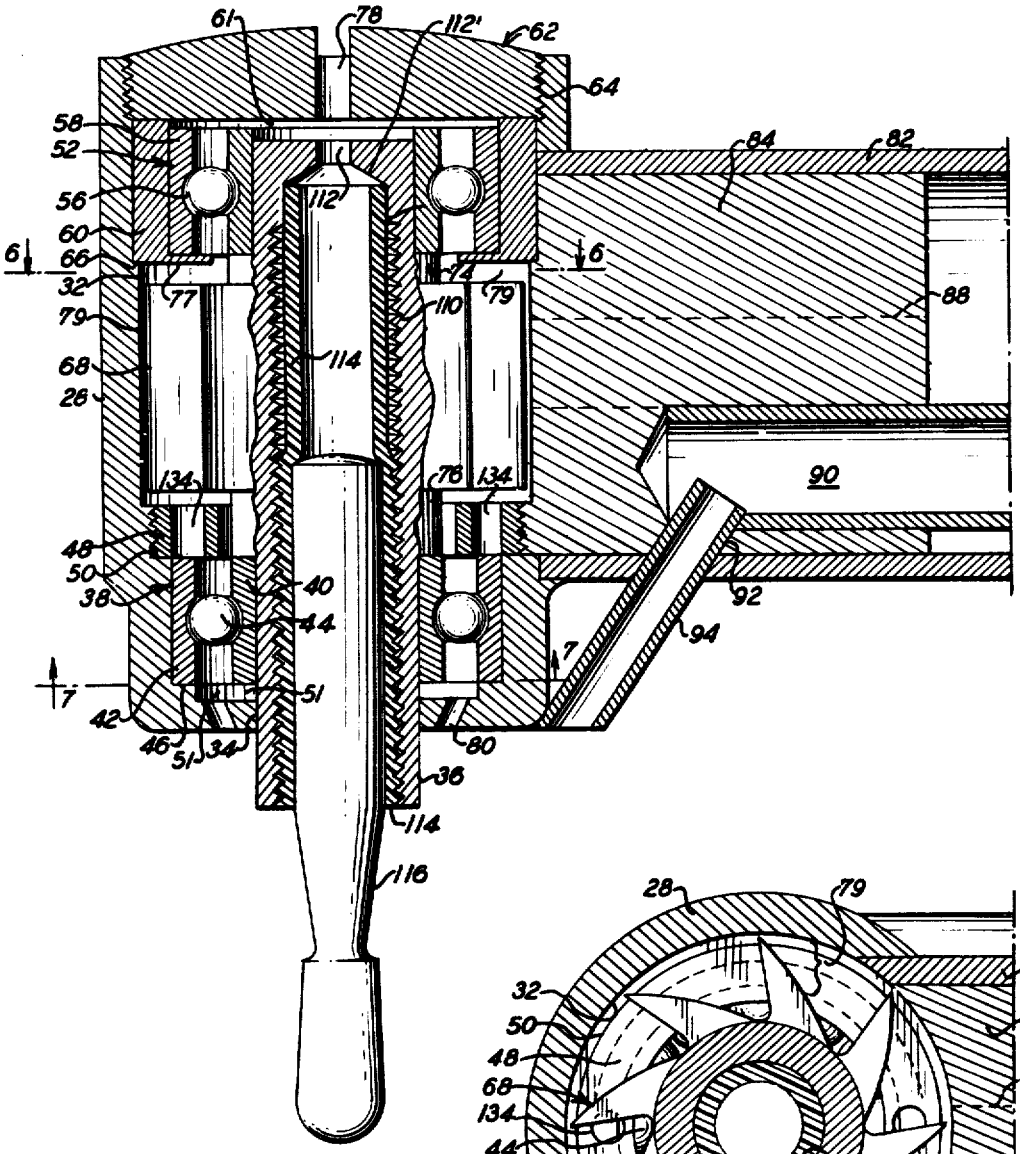
FIG. 5 is an enlarged, fragmentary, vertical sectional view of the head of the handpiece shown in FIG. 1 and especially showing details of the construction thereof.

The turbine rotor is provided with a chuck for a dental bur or the like, said chuck comprising a threaded bore 110 which extends inward from the lower end of shaft 36 almost to the top thereof, the upper end of bore 110 communicating with an opening 112 of much smaller diameter than bore 110 and extending axially through the upper end of shaft 36 to provide an annular shoulder 112'. A sleeve 114 formed of expansible and frictional material such as polyethylene or the like and having an outside diameter substantially the same as the thread crest diameter within the bore 110 is slid into said threaded bore until it abuts the annular shoulder 112' at the upper end thereof to position the sleeve longitudinally therein initially. The inside diameter of the sleeve 114 is slightly less than the outer diameter of the shank of a bur 116 which is to be forced axially into the sleeve from the lower end thereof. Thus, as the bur is inserted into the expansible sleeve, the sleeve deforms by expanding and assumes the configuration of the bore threads as shown in FIG. 5. A tight friction fit between the sleeve and bur results and prevents the accidental removal of the bur and also holds the bur at any desired longitudinal position within the chuck. The threaded engagement of the bore with the sleeve prevents the accidental removal of the sleeve while removing a bur, for example. Because the bur is gripped frictionally within the sleeve, the bur can be inserted at varying distances into the sleeve, thereby eliminating the necessity of having variable length burs, within certain limits. Further, by using sleeves of different thicknesses, burs having shanks of smaller diameter than that illustrated may be used. This is advantageous because the basic principle of operation of the handpiece for best efficiency is speed rather than inertia from mass.

The insertion of the bur into the sleeve is facilitated by the opening 112 being provided in the upper end of spindle 36 in that no air is trapped within the sleeve to resist such insertion. Further, the opening 112 permits any particulate material which may be lodged in the chuck to be aspirated therethrough by the air passing rapidly over the opening when being discharged through the upper bearing and exhausting through exhaust hole 78 in cap 62. In addition, should a bur be broken from its shank, the broken shank readily may be removed from the sleeve 114 by inserting a small wire through opening 112 to push the broken shank therefrom.

Operation

The handpiece is connected through suitable valves to the water and air supply normally present in a dentist's office. The air supply is preferably at between 20 and 30 pounds per square inch. The supply should be capable of delivering 1 to 1½ cubic feet per minute at this pressure. The air travels down tube 96 and discharges through the nozzle-forming bore 86 in the neck block 84. The air comes out as a high pressure jet tangentially against the axially aligned vanes 68 of the turbine rotor as shown in FIG. 6. The air expands against the flat surfaces 72 of the turbine rotor and reacts against the cylindrical bore in the housing to drive the turbine rotor at high speed between 100,000 and 200,000 r.p.m. or higher, depending upon the setting of the air inlet valve in the control unit or as adjusted by hand or foot action of the dentist. The expansion of the gas is continued almost 360° around the interior of the housing until it reaches the exhaust port 88. This air for rotating the rotor is confined to movement within the annular pocket 79 formed by the housing bore, the clamping washer 48 and the annular shield member 77, or the upper bearing and spacer ring in the event such shield member 77 is not provided.

In the meantime, excess air is discharging from the upper and lower ends of the spaces between the turbine blades 68, at the root areas thereof, and is passing through constricting annular openings onto the anti-friction members between outer and inner races of bearings 44 and 52. This discharging gas, being under pressure, has the tendency to lubricate or surround the anti-friction members so as to suspend them freely from each other and from the inner surfaces of both the outer and inner races, such spacing being shown in somewhat exaggerated form in FIG. 5. Thus the turbine is suspended on air during its high speed operation. Oil vapor in the gas also is dispelled against the adjacent members of each bearing and lubricates the same.

The gas leaving the bearings after passing therethrough, discharges through the opening 78 in the cap and also through the exhaust ports 80 in the lower part of the housing from which ports the gas is directed against the bur for cooling purposes.

A substantial part of the air delivered to the chamber of the turbine exhausts successively through slot 88 and constricting discharge opening 106, the latter maintaining the gas pressure within the turbine chamber at a desired pressure relative to the input pressure which has been found to produce sufficient torque so that about one pound of working pressure can be exerted by a bur upon a tooth surface for example, before the bur will stall. Even when the bur stalls however, no harm results. Further, the provision of such relative low operating pressure comprises a safety feature to prevent unintentional or accidental cutting with the bur, yet is not a detriment to achieving rapid cutting, even through hard tooth enamel, because the very high speeds permit the same.

The preferred recommended drilling technique, especially in removing enamel, as when preparing a tooth for the reception of a crown, is a light, brushing action. Cutting of tooth material and other hard substances such as dental metals is unusually fast, safe and sure, all with substantially no trauma to the patient or any noticeable sensation that drilling or cutting is taking place. Such cutting takes place while the tooth surface and bur are flushed with water, if desired, and the drill is constantly cooled by air discharging from the lower end of the turbine head onto the bur and tooth.

Even though operating at unusually high speeds, the bearings, which are the only parts of the handpiece subjected to wear, operate cooly and are lubricated lightly by oil, whereby the life of such bearings is many months. Further, replacement of bearings and chuck sleeve readily and quickly is accomplished by the dentist or assistant by using a simple compound tool.

Figure 13:
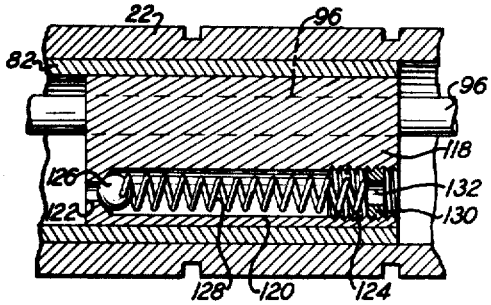
FIG. 13 is a fragmentary longitudinal sectional view of a modified form of gas exhaust port having an automatically operable regulating valve to control exhaustion of gas from the chamber in the head at a uniform pressure.

Another embodiment of constricting means for the gas exhausting through the rear end of handle 22 is illustrated in FIG. 13. Rather than provide a fixed opening 106 in disc 100 as described above, another form of controlled and adjustable constricting means may be used, details of an exemplary form of which are shown in said figure. It will be seen that a cylindrical plug 118 is brazed or otherwise fixed to the interior of tube 82 adjacent the outer end thereof. Said plug has suitable holes through which gas and water supply tubes 96 and 98 pass.

The plug also is provided with a gas discharge bore 120 extending longitudinally therethrough, the inner or inlet end being constricted at 122, and the outer end being internally threaded at 124. A check valve ball 126 is movable adjacent the constricted end 122 and when seated thereagainst, will close the constricted end of bore 120. A compression spring 128 of relatively light force extends between ball 126 and the inner end of a threaded seat 130 which is axially adjustable in the threaded end 124 of bore 120 to permit varying the pressure spring 128 exerts against the ball 126. Seat 130 has a central opening 132 of polygonal shape to permit engagement of a rotating tool therewith such as an Allen wrench to effect adjustment of seat 130 to vary the pressure of said spring to either increase or decrease the same. The opening 132 preferably is larger than the diameter of constricted opening 122 so as not to impede the controlled exhausting of gas as effected by the pressure of exhausting gas from tube 82 against ball 126 and spring 128. By the valve arrangement thus described, a controlled pressure within the housing 28 is effected even though the inlet gas pressure may vary during operation of the handpiece.

Assembly and servicing of handpiece

The unitary handle 22 and turbine housing 28 comprises an integral unit including neck block 84 and gas and water tubes 96 and 98, as well as water discharge tube 94. The turbine shaft and rotor 36 has the upper bearing 52 press-fitted onto the upper end thereof and spacer ring 60 is press-fitted onto the outer race 58 of said upper bearing, thus forming a sub-assembly unit. Lower bearing 38 is positioned against seat 46 in housing 28 and locking washer 48 is threaded against the outer race 42 of bearing 38 by any suitable means such as a spanner wrench having spaced lugs, for example, which are received respectively in openings 134 in washer 48, clearly shown in FIGS. 5 and 8.

The rotor sub-assembly next is inserted into housing 28 from the top, the lower end of shaft 36 being pressed through inner race 40 of lower bearing 38 to frictionally but separably connect the same. Such insertion of the rotor disposes lower collar 76 against inner race 40 of bearing 38 and incidentally disposes the lower end of spacer ring 60 against shoulder seat 66 in housing 28. Cap 62 next is threaded against the upper end of spacer ring 60 by means of a screw driver to lock outer race 58 of upper bearing 52 to housing 28 and also close the upper end of the housing. Cap 62 preferably has a screw driver slot in the top. Chuck sleeve 114 then is inserted longitudinally into threaded bore 110 of shaft 36 until it abuts annular shoulder 112' in the upper end thereof. A bur 116 then is inserted into sleeve 114 to expand the same into conformity to the threads 110, thereby preventing axial movement of the sleeve relative to shaft 36. Insertion of bur 116 into the sleeve 114 may be facilitated by first dipping the upper end of the bur shank into lubricant. Inasmuch as the sleeve preferably is formed of a suitable resin such as polyethylene, normal lubricants used by dentists for inserting burs in conventional drill chucks will not harm the sleeve.

Dis-assembly of the handpiece is achieved by a reversal of the operations described above except that replacement of sleeve 114 is achieved simply by inserting a longitudinally ribbed tool thereinto and unscrewing said sleeve from threaded bore 110. The turbine sub-assembly may be removed, after removal of cap 62, simply by pressing the lower end of shaft 36 against a firm surface, thereby slidably and forceably separating said shaft from its frictional fit with the inner race 40 of lower bearing 38. By unscrewing washer 48 by a simple spanner wrench and inverting housing 28, the lower bearing 38 falls therefrom. All of these operations readily and quickly may be performed by a dentist in his operating room, even in the midst of operating upon a patient if necessary.

The bearings 38 and 52 have the highest probable mortality of all elements of the handpiece and a spare or replacement rotor sub-assembly and lower bearing 38 usually are kept in stock by a dentist for instant replacement of these items when worn. Even under extreme conditions of use however, the average life of the bearings has been found to be a number of months, especially since the gas supplied the rotor for driving the same preferably is filtered by suitable means, in a control cabinet for example, before it enters the turbine housing 28. Hence no extraneous particulate matter may enter the bearings and, in the event any such material enters sleeve 114, at the time of inserting a bur for example, such material immediately will be aspirated through opening 112 in the upper end of shaft 36 and hole 78 in cap 62.

Although it is contemplated that a limited amount of lubricating oil, such as a light weight mineral oil, is introduced into the inlet gas preferably in the form of a mist of fog, and a portion of such gas is discharged through ports 80 and hole 78 from housing 28 into the oral cavity of a patient, such volume of gas is a minor amount compared to that which is discharged through the outer end of the handle of the handpiece. Also, inasmuch as the amount of oil needed for lubrication of the bearings is very small, it can be seen that, at the most, only an infinitesimal amount of such oil will enter the oral cavity of a patient. Mineral oil for such lubrication is highly effective, inexpensive and readily is obtainable in U.S.P. condition, whereby a patient will not be harmed by such use for lubrication of the bearings of the handpiece. Corn oil also is a desirable lubricant.

While it is contemplated that air is the preferred gas used to drive the turbine of the handpiece, other non-toxic gases may be used. Although small quantites of the lubricating oil may condense within the tube 82 after the exhausting gas enters the same, the constricting gas exhaust port 106 preferably is located near the bottom of disc 100 in normal position of use, and bore 120 in block 118 in the embodiment shown in FIG. 13 is similarly positioned, whereby any such small quantities of accumulating oil readily may drain from the outer end of handle 22.

From the foregoing, it will be seen that the dental handpiece and high speed turbine provided by the present invention comprises a revolutionary advance in this art. The simplicity of construction, smallness of size, lightness of weight, freedom from cables and gears, and complete freedom from vibration when operated at the preferred fluid pressures, result in an instrument which is highly desirable to a dental patient as a result of no trauma being experienced from the use of the handpiece and other comforts to the patient as well as benefits of ease of operation, and greater visibility to the dentist within the oral cavity. Only a minimum number of small-dimensioned flexible supply tubes for gas to drive the turbine and water for flushing and cooling the bur are used. The control of such supplies easily may be regulated and controlled by volves operated conveniently either by the hand or foot of the dentist or other operator.

Normal, relatively low air pressure supplies such as now are available in all dental offices drive the turbine and bur of the handpiece at phenominally high speeds in excess of 100,000 r.p.m. as well as at lower speeds, if desired. The housing of the turbine on the outer end of the handle is comparable to or even smaller in size than any commercial turbine dental handpieces now available. Yet the lack of vibration afforded by the present invention and lack of encumbering driving means, including freedom from all belts and gears produces a comfort for both the patient and dentist which is not possible by any presently available dental handpiece. Such benefits result from the principles which are believed to exist in the handpiece, such as the rotor and anti-friction bearing components operating while supported upon a cushion of gas such as air. The weight of the rotor is extremely small and burs having shanks of the smallest commercially available sizes of dental burs perform at highest efficiency with said handpiece. Thus, it is believed that speed is the factor which appears to contribute to the high cutting speeds at very light applied pressures upon the handpiece by the dentist, as distinguished from inertia and relatively heavy chucks of conventional slow speed handpieces which require far heavier applied pressure by a dentist. Hence no fly-wheel effect is necessary in the present invention.

The torque developed by the rotor of the handpiece comprising the invention depends upon the air pressure supplied to it but relatively low pressures of the preferred order of between 20 to 30 pounds is highly adequate to produce desired operating torque which, in conjunction with the speeds attained, makes it possible to obtain rapid cutting of even hard tooth enamal and dental metals, without appreciable physical pressure by a dentist. The very small inertia of the light weight rotor also affords the added advantage of quick stopping when the gas valve is closed or the bur is pushed too heavily or fast by the dentist against the surface being cut by the bur. However, instantaneous attainment or resumption of the maximum speed of the rotor is achieved upon again feeding gas to the turbine or relieving the bur of the above described pressures which caused it to stop. In conventional handpieces, the much heavier chucks have far more inertia and hence require accelerating time in contrast to the present invention.

Cartridge-type turbine rotor assemblies

The present invention also provides unique construction of several embodiments of cartridge-type roto assemblies each comprising a turbine rotor and anti-friction bearing units, which assemblies may be inserted within and removed from the housing of the handpiece more readily and quickly than the rotor and bearing construction of FIGS. 4 through 8. One embodiment of such cartridge-type assembly is illustrated in FIGS. 16 through 21 wherein the handpiece 10 comprises a handle 212 having a housing 214 fixedly secured to the outer end thereof. The head 214 preferably is substantially cylindrical as is best seen from FIGS. 16 and 21, the interior being hollow cylindrically for the ready reception of the unit 216 shown in side elevation in FIG. 16 and in exploded view in FIG. 18, and comprising a vaned rotor 218, which is similar to the rotor of FIGS. 4 through 8, having a shaft projecting from opposite ends thereof to provide an upper shaft portion 220 and a lower shaft portion 222 which preferably are of the same outer diameter. Fixed to these upper and lower shaft portions respectively are upper anti-friction bearing unit 224 and lower anti-friction bearing unit 226. A clamping ring 228 is fixed to the outer race of the upper anti-friction bearing unit 224 and a spacing means comprising a cylindrical casing 230 surrounds the vaned portion of the rotor 218 and extends between the lower edge of clamping ring 228 and the outer race of lower anti-friction bearing unit 226.

Referring particularly to FIG. 19, the head of the handpiece is shown in what will be referred to as its normal position of operation, wherein the head is disposed substantially vertically, but it is to be understood that the handpiece may be used when the head is disposed in any other position, especially within the oral cavity of a patient. In this so-called normal position, it will be seen that the upper end of housing 214 has an opening 234 through which the fluid operated turbine rotor assembly or unit 216 is inserted for reception within the housing 214. The inner wall defining opening 234 is threaded preferably to receive a clamping and closure cap 236 which is tightened into place within the opening 234 and against the upper end of unit 216 by any suitable means such as a simple screw driver. The cap 236 is provided with a screw driver slot 238 for this purpose.

Also referring to FIG. 19, it will be seen that the upper anti-friction bearing unit 224 comprises a cylindrical inner race 240 and a cylindrical outer race 242, each of which have conventional annularly curved seats which are opposed to each other for the reception of rotatable ball bearing members 244. The inner race 240 frictionally engages the upper shaft portion 220 of the rotor 218 by being press-fitted thereonto. As is described hereinabove, and also as is illustrated in exaggerated form in certain figures, especially FIG. 19, the inner and outer bearing races 240 and 242 are so dimensioned relative to the diameters of the ball bearing members 244 that sufficient clearance space 246 is provided between the ball bearing members and the inner surfaces of the races which receive them that lateral movement of the inner race relative to the outer race is permitted to the order of between 0.0002 and 0.005 inch. The purposes of this clearance space 246 are briefly set forth hereinabove and will be described in greater detail hereinafter. The lower anti-friction bearing unit 226 also comprises a cylindrical inner race 248 and an outer cylindrical bearing race 250. A plurality of ball bearing members 252 are disposed within the annularly curved opposed ways or seats within the inner and outer races and a clearance space 254 is arranged between the ball bearing members 252 and the races of the lower bearing unit as in regard to the upper bearing unit 224 discussed hereinabove. For ease of assembly and maintenance of inventory, the upper and lower anti-friction bearing units 224 and 226 may be identical but this is not mandatory in accordance with the principles of the invention. It also will be seen that the inner race 248 of the lower bearing unit 226 is preferably press-fitted onto the lower shaft portion 222 from the outer end thereof. If desired, the upper and lower shaft portions 220 and 222 respectively may be provided with annular shoulders 255 and 257 which primarily are for purposes of controlling flow of the fluid through the turbine rotor, primarily to prevent an appreciable amount of eddy currents and afford as direct flow of the fluid to the bearing units as possible.

The lower shaft portion 222 also comprises a chuck by which a dental bur or other instrument is connected to the rotor, said chuck being of the type described hereinabove relative to FIGS. 4 through 8. Referring to FIG. 19 particularly, it will be seen that the lower end of housing 214 is provided with an annular seat 256 against which the lower surface of the outer races 250 of lower bearing unit 226 abuts. Said lower end of the housing 214 however is also provided with another annular space 258, the vertical cylindrical wall of which preferably substantially bisects the annular space between the inner faces of the inner and outer races 248 and 250 of the lower bearing unit 226 as is clearly shown in FIG. 19. The bottom wall 260 of the housing 214, the upper surface of which is defined by the annular seat 256 and annular space 258 in stepped relationship, also is provided with a central aperture 262 through which the outer end portion of lower shaft portion 222 projects. Further, a plurality of gaseous fluid discharge openings or holes 264 are disposed in circumferentially spaced relationship around the central aperture 262 as is best shown in FIG. 20, these being similar to exhaust ports 80 of FIGS. 3 through 8.

Referring now to FIGS. 16, 18 and 19, it will be seen that the fluid operated turbine rotor assembly or unit 216 comprises, in addition to the vaned rotor 218 and upper and lower bearing units 224 and 226, a clamping ring 228 which, in the embodiment shown in FIGS. 15 through 21, is provided with an annular, inwardly directed flange 266 which defines a seat receiving the outer race 242 of the upper bearing unit 224, the cylindrical inner wall of the clamping ring 228 preferably frictionally engaging the outer race of the upper bearing unit by being press-fitted thereonto. The inner extremity of flange 266 of clamping ring 228 also preferably bisects axially the annular space between the inner and outer races 240 and 242 of upper bearing unit 224 to effect cooling of the gaseous fluid and increase the speed thereof in being directed against ball bearing members 244.

The spacing means comprising cylindrical casing 230 is so arranged when the components of the assembly or unit 216 are assembled that the upper end of the casing 230 abuts the lower surface of clamping ring 228 as clearly shown in FIGS. 16 and 19. The lower end of the casing 230 also is provided with an annular, inwardly directed flange 268, the lower surface of which abuts the upper end of the outer race 250 of the lower bearing unit 226 as is best shown in FIG. 19, the peripheral edge of flange 268 preferably bisecting the space between the races 248 and 250 of the lower bearing unit, for purposes similar to flange 266, described above.

From the foregoing, it will be seen that the spacing means comprising cylindrical casing 230 directly engages the outer race of the lower bearing unit 226 and interengages, through the medium of clamping ring 228, the outer race of the upper bearing unit 224, whereby when the cap 236 is threaded into the housing 214 directly against the upper end of clamping ring 228, said clamping ring will abut the upper end of casing 230 and the lower end of casing 230 will abut the upper end of the outer race of lower bearing unit 226 so as to force the lower end of outer race 250 against seat 256, coincidentally spacing apart in an axial direction the outer races of the upper and lower bearing units 224 and 226 a precise predetermined distance.

The assembly of all of the components of the turbine rotor assembly or unit 216 is easily accomplished in accordance with the exemplary illustration shown in FIG. 18, which assembly may be accomplished in several different ways, depending upon which is found most convenient. The end result however will be that the cylindrical casing 230 will surround the vanes 270 of the rotor 218, the inner races of the upper and lower bearing units 224 and 226 will be frictionally pressed onto the upper and lower shaft portions 220 and 222 respectively, and the clamping ring 228 will be pressed onto the outer race of upper bearing unit 224. The resulting assembly will resemble in side elevation the illustration shown in FIG. 16.

Due to the clearance spaces 246 and 254 provided respectively in the upper and lower bearing units 224 and 226, there is a possibility of a limited amount of axial movement of the casing 230 relative to the spacing ring 228 and the outer race of lower bearing unit 226 when the unit 216 is assembled as shown in FIG. 16. However, when the unit is seated within the housing 214 and the cap 236 is screwed into final position therein, the initial accurate positioning of the inner races of both bearing units upon the upper and lower shaft portions in combination with the accurate axial spacing of the outer races of the bearing units by means of casing 230 and clamping ring 228, will serve to so position the inner and outer races of each bearing unit relative to each other that the clearance spaces 246 and 254 in said bearing units will be maintained in the operative arrangement of the turbine rotor assembly within the housing 214.

Gaseous fluid under desired pressure is directed from a suitable source, not shown, by means of flexible tubing or otherwise, to the outer end 272 of a fluid inlet conduit which discharges into inlet port 274 within handle 212 as shown in FIG. 20. The inlet port 274 communicates with the interior of housing 214 and, to permit such communication, the casing 230 is provided with an inlet opening 276 which registers with the inlet port 274 of the handle when the unit 216 is accurately positioned for operation within the housing 214. In order to insure the registration of inlet port 274 with inlet opening 276, the housing 214 and unit 216 are provided with interengaging indexing means, an exemplary type of which illustrated herein comprises an axially extending groove 278 formed in the outer surface of casing 230, as shown in FIGS. 19 and 20, and a pin 280 which is seated within a suitable recess within housing 214 and extending axially of said housing for reception within the groove 278 as shown in FIGS. 19 and 20.

In accordance with the principles of the present invention, as well as the invention disclosed and claimed in said pending application, gaseous fluid is introduced through inlet port 274 and inlet opening 276 so as to engage the vanes 270 of the rotor 218 as is evident from FIG. 20. Such engagement serves to rotate the rotor rapidly and as the gaseous fluid expands, it is discharged from opposite ends of the spaces between the vanes 270 directly into the spaces between the inner and outer races of both of the bearing units 224 and 226 so as to engage the ball bearing members 224 and 252, thereby cooling the same and also causing the ball bearing members and rotor, in effect, to float upon a cushion of gaseous fluid when a desired amount of pressure exists within the housing 214 as explained in regard to the embodiment described in FIGS. 1 through 14. When said gaseous fluid passes through the bearing units, it is discharged respectively through a central opening 282 in cap 236 and the fluid discharge holes 264 formed in the bottom wall 260 of the housing, the latter being discharged onto the bur, for example, held within the lower shaft portion 222.

Only a limited amount of the discharging gaseous fluid exits from the housing 214 through the openings 264 and 282 however. A substantial portion of the gaseous fluid which drives the rotor 218 is discharged through exhaust conduit 284 to atmosphere. Exhaustive conduit 284 extends axially of handle 212. If desired, suitable filter or muffling means, not shown, may be included within the handle 212 and the discharging fluid may first pass through said means before being discharged to atmosphere.

Also provided in handle 212 is a water conduit 285, see FIG. 19. The outer end 286 of conduit 285 projects beyond the outer end of handle 212 and may be connected to a flexible water conductor in communication with a conventional supply of water in a dental office. The inner end of water conduit 285 communicates with a discharge tube 287 directed toward the bur or other dental tool to be mounted within the chuck end 222 of the rotor shaft.

In order that the gaseous fluid being exhausted or discharged from the interior of housing 214 may enter the exhaust conduit 284, the casing 230 also is provided with an exhaust port 288 which preferably is co-extensive in size and shape with the conduit 284 as clearly shown in FIG. 20. Not only will the indexing means align the inlet port and openings 274 and 276 but simultaneously will also align exhaust port 288 with exhaust conduit 284.

The present invention also includes a second embodiment of cartridge-type rotor assembly illustrated in FIGS. 22 through 25, said second embodiment containing certain changes in structure over the embodiment shown in FIGS. 15 through 21 which, under certain circumstances, may possibly have manufacturing advantages over the latter embodiment, or vice versa.

In the additional embodiment of cartridge-type rotor assembly shown in FIGS. 22 through 25, the housing 214 is similar except that the bottom thereof is formed with a different annular seat 290 which receives a second clamping ring 292 which is press-fitted onto the outer race 250 of lower bearing unit 226. Preferably, the clamping ring 292 is very similar to the upper clamping ring 228, the outer ends of both of said clamping rings preferably extending beyond the outers ends of the outer races of the bearing units to which they are connected, whereby when the cap 236 engages the upper end of upper clamping ring 228, there will be no interference between the the cap and the inner race of upper bearing unit 224. Similarly, there will be no interference between the inner race 248 of lower bearing unit 226 and the bottom wall 294 of housing 214 as is clearly evident from FIG. 24.

By the use of a pair of clamping rings 228 and 292 as shown in FIG. 24, it is possible to use a simple cylindrical casing 296 of uniform diameter from end to end, the opposite ends of which respectively abut the inner end surfaces of the upper clamping ring 228 and lower clamping ring 292 when the fluid operated turbine rotor assembly 298 such as illustrated in FIGS. 22 and 23 is introduced into the opening 234 at the upper end of housing 214 and is operatively positioned within housing 214 with the lower clamping ring 292 abutting the annular seat 290. The cap 236 will abut the upper end of upper clamping ring 228 to hold the assembly firmly and operatively positioned within the housing 214. Inasmuch as the upper and lower clamping rings 228 and 292 respectively are press-fitted to the outer races of the upper and lower bearing units 224 and 226 to space the same axially precisely the same distance as outer races 242 and 254, such positioning of the unit 298 within the housing 214 will serve to maintain the outer races stationary relative to the housing when the cap 36 is secured in operative position against the unit and the clearance spaces 246 will be fully effective.

If desired, particularly in regard to the embodiment shown in FIGS. 22 through 25, a single opening 300 may be formed within the cylindrical casing 296, rather than use separate inlet and outlet ports through the casing as is contemplated in the construction of the embodiment shown in FIGS. 15 through 21. When using the single opening 300, it is preferred that the same will extend approximately 180° around the circumference of casing 296 as is clearly evident particularly from FIGS. 22 and 25. By using a single opening 300, it will be seen that said opening commonly will communicate both with the exhaust conduit 284 and the inlet port 274 within the handle 212.

By using an opening 300 of the width and length illustrated in exemplary manner in FIGS. 22 and 25, it will be seen that the assembly of the turbine motor unit 298 within the housing 214 may take place readily without requiring indexing means. It only will be necessary to introduce the unit into the upper end of housing 214 with the opening 300 therein approximately centered toward the handle 212 before finally dropping the unit into the feeding means within housing 214. Screwing the cap 236 into the top of the housing will effectively clamp the unit 298 within the housing and maintain the outer races of both bearing units stationary relative to said housing. Such clamping also will prevent relative rotation of the unit with the housing 214; whereby the opening 300 will be operatively disposed relative to the inlet port 274 and exhaust conduit 284 during all conditions of operation of the handpiece.

Otherwise, the embodiment shown in FIGS. 22 through 25 will function similarly to the embodiment shown in FIGS. 15 through 21, particularly in respect of the floating of the rotor and anti-friction members of the bearing units when adequate fluid pressure is supplied to the handpiece. The fluid in discharging from the opposite ends of the spaces between the rotor vanes 270 will pass through the anti-friction bearing units to cool the same as in regard to the first described embodiment. The inner races of both of said bearing units will be press-fitted upon opposite ends of the rotor as in regard to the first described embodiment, whereby the clearance spaces 246 and 254 within the bearing units will be maintained and no abnormal loading of the components of either bearing unit will be experienced, particularly since the accurate spacing of the inner races of the bearing units upon the rotor will be maintained due to the press-fitting thereof upon the rotor and the accurate axial spacing of the outer races relative to the inner races and each other is insured by the assembly of the upper and lower clamping rings 228 and 292 which are held in predetermined spaced relationship by casing 296 when the assembly is clamped in operative position within the housing 214 by cap 236.

The insertion of either of the fluid operated turbine rotor assemblies or units within the housing 214 is achieved very simply in the manner illustrated in FIG. 21 wherein the lower end of the unit 216 is shown partly inserted into the upper end of housing 214. Preferably, a very limited amount of tolerance in diameters is afforded between the interior of housing 214 and the exterior of assembly or unit 216, whereby it is not necessary to forcibly press the unit 216 into the housing 214 under preferred conditions of operation. In regard to the first described embodiment, when the assembly or unit 216 is introduced nearly the entire distance into the housing 214, the keying means must be brought into registry with each other but this is facilitated by the tapering of the upper end of pin 280 as indicated in FIG. 19. No such indexing is necessary in regard to the embodiment shown in FIGS. 22 through 25 however although indexing may be used if desired.

Still a third embodiment of cartridge-type rotor assembly is illustrated in FIG. 26 of the drawings, this type being similar to the embodiment illustrated in FIGS. 22 through 25 in that it uses a simple, cylindrical or tubular type casing which cooperates with anti-friction bearing units of a larger size than employed in FIGS. 22 through 25.

Referring to FIG. 26 particularly, wherein the vaned rotor 218 and its detailed characteristics are the same as in the embodiment shown in FIGS. 22 through 25, it will be seen that the housing 210 has a slightly modified lower seat 302 which receives the outer race 304 of the lower bearing unit comprising inner race 306 which is press-fitted onto the lower shaft portion 222 of the rotor 218. The seat 302 is co-axial with a shallow, annular recess 308, within the bottom wall of which the fluid discharge holes 264 are formed. The annular, axially extending wall of the annular recess 308 preferably intersects the space 310 between the inner surfaces of the outer and inner races 304 and 306 in order to partially restrict discharge of gaseous fluid therethrough and thus preserve a desired amount of pressure of fluid within the space 310 in order to partially restrict discharge of gaseous fluid therethrough and thus preserve a desired amount of pressure of fluid within the space 310 in order to provide a floating action for the anti-friction balls 312. As in the above described embodiments, a clearance space 314, shown in exaggerated form in FIG. 26, exists between the annular, curved ways or seats for the anti-friction members 312 in order to permit the members 312 and the rotor to float upon a cushion of air or upon air bearings, in effect, as described in detail above, when the required amount of pressure of gaseous fluid exists within the interior of the housing 210.

The upper bearing unit shown in FIG. 26 is preferably identical with the lower bearing unit and the inner race 306 is press-fitted upon the upper shaft portion 220. Rather than provide clamping rings as in the embodiment shown in FIGS. 22 through 25, the embodiment shown in FIG. 26 requires no such clamping rings in that the outer races 304 are of sufficient diameter that the peripheral surfaces thereof substantially contact the inner cylindrical wall of housing 210 except for the slight clearance provided therebetween, of the order of 0.001 or b 0.002 inch, as in the above described embodiments, to permit ready insertion and removal of the rotor assembly into and from the housing 210.

In this embodiment of the invention, the rotor assembly comprises the rotor 218, the upper and lower bearing units, and spacing means for the outer races of the bearing units comprising a cylindrical casing 316 which is similar to the casing 296 of the embodiment shown in FIGS. 22 through 25. From FIG. 26, it will be seen that the inner end surfaces of the outer races 304 of both of the bearing units respectively abut the opposite ends of casing 316. Also, the outer diameter of casing 316 is preferably only 0.001 or 0.002 inch smaller in diameter than the inner diameter of housing 210, whereby the inner cylindrical surface of casing 210 serves to coaxially align the outer races of the bearing units and the casing 316 and also center the same relative to the housing 210.

A cap 316 having a fluid exhaust opening 318 therein is threaded into the upper portion of the cylindrical opening in the housing 210 comprising the upper end of the cylindrical interior thereof. The cap also is provided with a shallow cylindrical cavity 320 on the inner surface thereof, the cylindrical, axially extending wall defining the perimeter thereof preferably substantially bisecting the annular space 310 between the races of the upper bearing units, for a purpose similar to the peripheral wall of the annular recess 308 in the bottom portion of the housing 210, whereby the discharge of gaseous fluid through the races of both bearings is restricted for the purpose stated above. Further, the annular recess 308 and cavity 320 permit free movement of the inner races of the respective upper and lower bearing units when the rotor 218 is rotating.

Preferably, the casing 316 is provided with a single opening in the cylindrical wall thereof similar to the exhaust opening 300 in the embodiment shown in FIGS. 22 through 25. If desired however it is to be understood that inlet and exhaust ports similar to ports 276 and 288 of the embodiment shown in FIGS. 15 through 21 may be used in lieu of the single opening 300, if desired. The opening 300 in the respective embodiments serves both as an inlet and exhaust port for the gaseous fluid. If however respective inlet and outlet ports such as 276 and 278 are used in the embodiment shown either in FIGS. 22 through 25, or in FIG. 26, it will be understood that indexing means similar to groove 278 and pin 280 shown in FIG. 19 should be employed to index the fluid inlet and outlet ports relative to the conduits therefor in the handle 212.

The assembly of the various components of the turbine rotor assembly shown in FIG. 26 is similar to the assembly of the previously described embodiments, namely, one or the other of the anti-friction bearing units is press-fitted onto one end of the rotor, the casing 316 is then placed around the vaned portion of rotor 218, and the other anti-friction bearing unit then is press-fitted onto the opposite end of the rotor while the inner and outer races of both of the bearing units respectively are held in flat planes extending transversely to the axis of the rotor and spaced axially apart a distance equal to the length of the casing 316. When the inner faces of both of the outer races of the upper and lower bearing units abut respectively the opposite ends of casing 316, pressing of the bearing units then is stopped. As a result of this, the clearance spaces 314 between the races of both bearing units then will be established automatically with the attending benefits described above relative to the other embodiments.

Further, it will be seen relative to the embodiment of FIG. 26 that the outer races of the bearing units respectively directly abut the opposite ends of the casing 296, thus providing a more simple construction for spacing the bearings apart a precise distance axially than is present in the embodiments shown in FIGS. 15 through 25 but a larger size bearing is required at opposite ends of the rotor than is required in the latter embodiments in order to accomplish this.

Illustrated in FIGS. 27 and 28 is a still further embodiment of a cartridge-type, fluid-operated turbine rotor assembly which may be employed in the handpiece 210 shown in FIG. 15, for example. The embodiment illustrated in FIGS. 27 and 28 has possible manufacturing advantages over the embodiments illustrated in FIGS. 16 through 26, for example, and, depending upon manufacturing equipment available to a manufacturer, may be preferred to the above-described embodiments shown in FIGS. 16 through 26.

In the embodiment shown in FIGS. 27 and 28, the assembly of the inner races of the bearing units 322 and 324 relative to the upper and lower shaft portions 326 and 328 is the same as in the embodiments shown in FIGS. 16 through 26. However, the outer races 330 of the bearing units are of the type which are provided with radially extending flanges 334, preferably projecting from the inner ends of the outer races 330.

By the use of flange-type outer races 330, as shown in FIGS. 27 and 28, a very simple type of cylindrical casing 336 may be utilized which may be cut from standard metallic tubing, for example, of suitable diameter and wall thickness, the ends of the casing 336, however, being smoothly formed and disposed within very flat parallel planes respectively in order to form firm abutments for the opposite ends of the casing 336 with the flat opposed surfaces of radial flanges 334 on the outer races 330. Preferably, the outer diameter of cylindrical casing 336 is the same as the outer diameter of the radial flanges 334 of the outer races 330 of the bearing units.

Inasmuch as the inner races 338 of the upper and lower bearings units are press-fitted onto the opposite ends of the shaft of the rotor 340, the outer races of the bearing units are inseparable axially from the inner races, the assembly comprising the turbine rotor 340, the upper and lower bearing units, and the casing 336 will normally be inseparable without the aid of special tools. As is evident from FIG. 27 particularly, there is provided only a very limited amount of space between the interior of housing 342 and the exterior of both the casing 336 and the periphery of flanges 334 of the outer races of the bearing units, such spaces amounting preferably only to 0.001 or 0.002 inch. The thickness of the wall of casing 336 also is substantially greater than the clearance space between the casing and tips of the rotor vanes 334. Hence, the bearing units shown in FIGS. 27 and 28 will serve to center the rotor 340 relative to the housing 342 and, when mounted within the housing 342, the scant clearance between the interior of the housing and the exterior of casing 336 and flanges 334 will axially center the casing and bearing units within the housing 342 whereby the positioning of the assembly within the housing will serve to space the interior of the casing 336 substantially evenly relative to the tips of the turbine vanes 334.

The housing 342 also is provided with a fluid inlet port 346, as shown in FIG. 28, and a fluid outlet port 348 which must be indexed or oriented relative to the fluid inlet conductor 274 and fluid discharge opening 284 within the handle 212 of the hand-piece illustrated in FIGS. 15 through 26. Accordingly, indexing means of exemplary type such as a radially projecting pin 350 is pressed into a suitable hole formed in one wall of the casing 330, as seen in FIGS. 27 and 28, the outer end of said pin being received within a vertical groove 356 formed within the inner wall of the housing 342, as seen in FIG. 27.

When the embodiment of assembly shown in FIGS. 27 and 28 is inserted within the housing 342, the lower end of outer race 330 of the lower bearing unit 324 will abut the lower seat 358 in the housing 342. Upon screwing the cap 360 into the housing 342 so as to close the opening in the upper end thereof through which the assembly has been inserted, the interior annular shoulder 362 within the cap will abut the upper end of the outer race 330 of the upper bearing unit 322 as clearly shown in FIG. 27, thereby forcing the flanges 334 of both of the outer races of the bearing units into firm abutting relationship with the opposite ends of casing 336, thereby accurately positioning the outer races of the bearing units axially and precisely relative to each other. Such screwing of the cap into firm relationship with the housing 342 also will clamp the outer races of both bearing units stationarily relative to housing 342. The assembly of the bearing units 322 and 324 onto the opposite ends of the shaft of the rotor 340 in the embodiment of FIGS. 27 and 28 is similar to that which takes place relative to the embodiment shown in FIGS. 16 through 26, whereby the clearance spaces 364 between the ball bearing members 368 and the curved annular ways or seats therefor in the inner and outer races will be maintained when the rotor assembly is positioned operatively within the housing 342 and clamped thereby by cap 360.

Features of the embodiment shown in FIGS. 27 and 28 which are not described in further detail than set forth above are similar to the corresponding features in the embodiments shown in FIGS. 16 through 26 and the operation of the embodiment shown in FIGS. 27 and 28 is otherwise the same as that of said above-described embodiments.

The cartridge-type fluid operated turbine rotor assemblies preferably may be pre-assembled at a factory to insure very precise and definite spacing of both the inner and outer races of the two anti-friction bearing units on the rotor assembly, whereby when the units or assemblies are mounted within the housing of a handpiece, the clearance spaces which are desired between the races and anti-friction ball bearings of both of the bearing units are maintained when the units are clamped in final position within seating means formed in the housing of the handpiece. Four embodiments of means for maintaining particularly the outer races of the bearing units spaced precisely axial distances of predetermined dimension are illustrated in FIGS. 15 through 28 and are described hereinabove, all of these having similar basic principles. Due to the spacing constructions provided for both the inner and outer races of the rotor assemblies or units, no abnormal loading of the bearing units is possible since the spacing of the races in an axial direction relative to each other is accurately determined by spacing means which also comprise casings embodied in the rotor assemblies or units. By the inclusion of the lower bearing unit within the rotor assembly, as distinguished from the arrangement described in FIGS. 1 through 14, the insertion of the rotor assembly within the housing is greatly facilitated and renders the clearance spaces in the bearing units available automatically upon insertion of the assembly within the housing of the handpiece and clamping it in operative position therein by means of the threaded cap.

As is described in regard to the structure of FIGS. 1 through 14, it is contemplated that the bearings of the rotor assemblies within the handpieces illustrated in FIGS. 15 through 28, in addition to being cooled by the discharge of gaseous fluid through the bearing units, also will be lubricated by the introduction of preferably liquid lubricant within the gaseous fluid being supplied to the rotors of the handpieces to prolong the life of the bearings of the rotor assemblies.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A high speed dental handpiece comprising a housing having opposite ends provided with fluid discharge means therein, a shaft within said housing extending between said opposite ends thereof, means on one end of said shaft to connect a dental tool thereto, a rotor carried by said shaft between the opposite ends thereof, bearings having anti-friction members movable therein and supported within said housing to support rotatably said shaft respectively adjacent opposite ends of said rotor, each of said bearings having an opening therethrough, impeller means on said rotor extending generally axially of said rotor and terminating adjacent the opposite ends thereof, means to direct gaseous fluid under pressure against said impeller means to rotate said rotor, and means on said rotor operable to discharge driving gaseous fluid in opposite directions directly from said impeller means and through said openings in each of said bearings for exhaust from said housing through said discharge means in said opposite ends thereof.

2. A high speed gaseous fluid operated turbine dental handpiece comprising a housing, a rotor mounted within said housing and having fluid engageable impeller means therein, said rotor having means to connect a tool thereto, radial anti-friction bearings having annular spaces therethrough and having anti-friction bearing members movable therein, said bearings being mounted within said housing adjacent opposite ends thereof and supporting said rotor with said impeller means thereof disposed between said bearings and said impeller means discharging gaseous fluid directly and axially through said annular spaces of said bearings, the outer diameter of said rotor being greater than that of the annular spaces in said radial bearings and said housing having inlet means positioned to direct gaseous fluid against the impeller means of said rotor, and discharge means in said housing communicating with said annular spaces in said bearings and positioned to receive gaseous fluid discharged from said rotor through said bearing spaces, whereby said rotor rotates within an annular pocket within said housing.

3. The high speed dental handpiece set forth in claim 2 further characterized by said impeller means of said rotor extending radially therefrom and said rotor being provided with spaces between said impeller means and the opposite ends of said spaces being open and positioned opposite the said annular spaces in said bearings to discharge gaseous fluid from said spaces directly through the annular spaces of said bearings.

4. A high speed rotary dental handpiece comprising a housing, a rotor mounted within said housing and having fluid engageable impeller means therein comprising radial vanes spaced circumferentially around said rotor and extending substantially axially thereof, the opposite faces of each vane being at an acute angle to each other at the tips of said vanes and one face of each vane being substantially planar and the opposite face being convex, said rotor having means to connect a tool thereto, radial anti-friction cageless bearings having annular spaces therethrough and anti-friction bearing members movable therein, said bearings being mounted within said housing adjacent the opposite ends thereof and supporting said rotor therein with said impeller means thereon disposed between said bearings and said impeller means discharging gaseous fluid directly axially through said annular spaces of said bearings and the apex formed by the intersection of the planar surface of one vane and the convex surface of an adjacent vane lying immediately adjacent to and in axial alignment with the balls of said bearings, the outer diameter of said rotor being greater than that of the annular spaces in said bearings and said housing having inlet means positioned to direct gaseous fluid against the impeller means of said rotor, and discharge means in said housing communicating with said annular spaces in said bearings and positioned to receive gaseous fluid discharged from said rotor through said bearing spaces, whereby said rotor rotates within an annular pocket within said housing.

5. A high speed dental handpiece operated by a fluid driven rotary motor comprising, a housing having a cylindrical bore, a rotor concentrically mounted in said bore, bearings at opposite ends of said rotor supporting said rotor in said bore and having passages therethrough in an axial direction, said housing being mounted on one end of a handle, a fluid inlet passageway in said handle for directing a jet of fluid against said rotor to drive the same, an exhaust passageway in said handle, and means constricting said exhaust passageway to create a pressure in excess of atmospheric within said housing, the cross-sectional area of the inlet passageway relative to the summation of the cross-sectional areas of all exhaust passages being such that at operative inlet pressures the pressure at the exhaust passages is greater than that which will permit suction into said housing.

6. A high speed gaseous fluid driven turbine type dental handpiece comprising in combination, a housing having a cylindrical inner surface, a turbine rotor and concentric shaft supported for rotation within said housing, impeller means on said rotor comprising axially extending vanes substantially co-extensive in length with said rotor, annular means adjacent opposite ends of said rotor and adjoining and extending radially inwardly from said inner surface adjacent the opposite ends of the vanes of said rotor to form with said inner surface an annular pocket within which the outer ends of said vanes rotate, the opposite ends of said rotor shaft extending through the central openings of said annular means and being radially spaced therefrom to provide annular exhaust openings extending around said shaft, means to direct gaseous fluid under pressure into said housing and against the vanes of said rotor to rotate the same, said gaseous fluid being exhausted at least partially from the opposite ends of said impeller means through said annular exhaust openings and the diameters of said central openings of said annular means being greater than the root diameter of said rotor vanes, whereby fluid discharges from the apexes of the spaces between adjacent vanes through said annular exhaust openings.

7. A high speed dental handpiece comprising an elongated handle having fluid inlet and exhaust conduit means extending longitudinally thereof, a housing connected to one end of said handle and the interior thereof communicating with said conduit means of said handle, said housing having opposite ends provided with fluid discharge means therein, a shaft in said housing extending axially between said opposite ends thereof, means on one end of said shaft to connect a dental tool thereto, a rotor carried by said shaft between the opposite ends thereof and provided with impeller means, bearings supported within said housing and rotatably supporting said shaft respectively adjacent opposite ends of said rotor, said fluid inlet means of said handle being arranged to direct gaseous fluid under pressure against said rotor impeller means to rotate the same, means on said rotor operable to discharge a portion of the driving gaseous fluid from said impeller means past at least one of said bearings for exhaust through the discharge means at the adjacent end of said housing, another portion of said driving gaseous fluid being discharged through said exhaust conduit means of said handle, and exhaust constricting means in said exhaust conduit means operable to control the amount of gaseous fluid discharged therethrough relative to that exhausted through said discharge means in the ends of said head to insure discharge through the latter means adequate to prevent suction into said head.

8. A high speed dental handpiece comprising an elongated handle having fluid inlet and exhaust conduit means extending longitudinally thereof, a housing connected to one end of said handle and the interior thereof communicating with said conduit means of said handle, said housing having opposite ends provided with constricted fluid discharge means therein, a shaft in said housing extending axially between said opposite ends thereof, means on one end of said shaft to connect a dental tool thereto, a rotor carried by said shaft between the opposite ends thereof and provided with impeller means, bearings supported within said housing and rotatably supporting said shaft respectively adjacent opposite ends of said rotor, said fluid inlet means of said handle being arranged to direct gaseous fluid under pressure against said rotor impeller means to rotate the same, means on said rotor operable to discharge a portion of the driving gaseous fluid in opposite directions from said impeller means through both of said bearings for exhaust through the discharge means in the adjacent ends of said housing, another portion of said driving gaseous fluid being discharged through said exhaust conduit means of said handle, and exhaust constricting means in said exhaust conduit means operable to control the amount of gaseous fluid discharged therethrough relative to that exhausted through said constricted discharge means in the ends of said housing to insure discharge through the latter means adequate to prevent suction into said housing.

9. A high speed gaseous fluid driven turbine type dental handpiece comprising a housing, a rotor mounted for rotation within said housing and having fluid engageable impeller means thereon, said rotor having means to connect a tool thereto, a pair of bearings mounted within said housing and spaced axially of said rotor and supporting said rotor with said impeller means thereof disposed between said bearings, means to direct gaseous fluid under pressure against said impeller means to rotate said rotor, means on said rotor operable to discharge driving gaseous fluid in opposite and axial directions directly from said impeller means, gaseous driving fluid discharge means in said housing extending therefrom to a position remote from said housing to discharge a portion of said driving fluid directly from the rotor-containing portion of said housing to atmosphere, and additional gaseous driving fluid discharge means in said housing positioned to communicate respectively and axially with the ends of said impeller means beyond both of said bearings to discharge other portions of said driving gaseous fluid from said housing directly to exterior atmosphere.

10. The dental handpiece assembly according to claim 6 further including radial anti-friction bearings concentric with said annular exhaust openings and supporting the opposite ends of said rotor shaft adjacent said annular means, whereby fluid discharging through said annular exhaust openings passes directly and axially through said anti-friction bearings under pressure greater than atmospheric.

11. A high speed dental handpiece utilizing a high speed fluid driven motor comprising a rotor shaft supported at opposite ends by radial bearings in a housing, a threaded bore extending inwardly from one end of said shaft and concentric with the axis thereof, a tubular insert of deformable resilient material in said bore and having an outside diameter less than the root diameter of said threads, the outer surface of said insert being substantially conformable to the contour of said threads upon insertion into said insert of a tool shank having a diameter greater than the inside diameter of said insert, an opening formed in the top of said rotor shaft communicating with said bore, said opening permitting the escape of air to facilitate the insertion of said tool shank, and means for passing fluid over the upper end of said shaft to aspirate particulate material from the interior of said insert.

12. A chuck for a dental handpiece comprising, a tube, a tubular insert of deformable resilient material in said tube and having an outside diameter approximately the same as the inside diameter of said tube, said insert having an inside diameter slightly less than the outside diameter of a tool shank to be received therein, and means on said tube and insert operable upon insertion of said tool to interlock against axial movement whereby said insert fits tightly about said tool and is forced into firm frictional engagement with the internal walls of said tube.

13. A chuck according to claim 12 further comprising internal threads on said tube to receive a cold flow of said deformable material in at least partial conformity to said threads upon insertion of said tool.

14. A chuck for a dental handpiece comprising an internally threaded tube, a tubular elastic synthetic resin insert having an outside diameter smaller than the root diameter of said threads, the outside surface of said insert being substantially conformable to the contour of said thread upon being stretched radially outwardly by insertion of the shank of a tool to be received therein.

[15. A dental instrument having a rotor, said rotor having a hole extending inwardly from one end thereof and concentric with the axis thereof, the outer end of said hole being adapted to receive a tool shank in frictional sliding engagement therewith and the other end of said rotor having an opening communicating with said hole to permit escape of air to facilitate the insertion of said tool shank within said hole.]

16. [A dental handpiece chuck according to claim 15] *A dental instrument having a rotor, said rotor having a hole extending inwardly from one end thereof and concentric with the axis thereof, the outer end of said hole being adapted to receive a tool shank in frictional sliding engagement therewith and the other end of said rotor having an opening communicating with said hole to permit escape of air to facilitate the insertion of said tool shank within said hole,* further comprising means for passing a fluid over said other end of said rotor to aspirate particulate material from the interior thereof.

17. A high speed rotary dental handpiece operated by a fluid driven rotary motor comprising, a housing, a rotor concentrically mounted within said housing and having a shaft provided with a bore extending inward from one end thereof to engagingly receive the shank of a dental tool, the other end of said shaft having a hole extending thereinto and communicating with the inner end of said bore and operable to expel air from said bore upon the insertion of the shank of a dental tool therein, bearings at opposite ends of said rotor rotatably supporting said rotor in said housing and said bearings having passages therethrough in an axial direction, means to introduce fluid into said housing and direct it against said rotor to drive the same, and exhaust means to discharge said fluid from said housing, said exhaust means comprising said passages through said bearings and other exhaust passage means from said housing, said other exhaust passage mean comprising means for passing a fluid over the outer end of the hole in said shaft to aspirate particulate material therefrom.

18. A high speed fluid driven dental handpiece comprising a housing having a substantially cylindrical recess therein, a lower radial bearing seated in the bottom of said recess, locking means detachably secured in said recess immediately above said bearing and locking the outer race of said bearing against the bottom of said recess, a vaned rotor having a spindle at one end frictionally and slidably engaging the inner race of said lower bearing for rotation therewith, an upper radial bearing having its inner race fixed to the other end of said rotor and the outer race thereof interengaging a seat in said recess, and a cap detachably secured to the upper end of said recess and interengaging said outer race to hold the same fixed relative to said seat.

19. A high speed fluid driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a vaned rotor having a spindle at one end frictionally and slidably engaging the inner race of said lower bearing for rotation therewith, an upper radial bearing having its inner race fixed to the other end of said rotor, a cylindrical spacer ring fixed to the outer cylindrical surface of said outer race and resting against a shoulder in said recess, and a cap detachably secured in said recess for holding said cylindrical spacer ring against said seat.

20. A high speed fluid driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a rotor having axially aligned vanes and a spindle at one end frictionally and slidably engaging the inner race of said lower bearing for rotation therewith, an upper radial bearing having its inner race fixed to the other end of said rotor and the outer race thereof interengaging a seat in said recess, and a cap detachably secured in said recess and interengaging said outer race to hold the same fixed relative to said seat, the upper and lower ends of said vanes being spaced respectively from said upper bearing and washer respectively a distance in the range of between 0.005–0.025 inch.

21. A high speed fluid driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a rotor having a spindle at one end frictionally and slidably engaging the inner race of said lower bearing for rotation therewith, an upper radial bearing having its inner race fixed to the other end of said rotor and the outer race thereof interengaging a seat in said recess, and a cap detachably connected to the upper end of said housing and interengaging said outer race of said upper bearing to hold the same fixed relative to said seat, said rotor having axially aligned vanes projecting radially outwardly into an annular pocket formed by the surface of said recess, the upper bearing outer race and said washer, approximately one-half the radial projection of said vanes being enclosed by said pocket.

22. A high speed fluid driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a vaned rotor having a spindle at one end frictionally and slidably engaging the inner race of said lower bearing for rotation therewith, an upper radial bearing having its inner race fixed to the other end of said rotor and the outer race thereof interengaging a seat in said recess, a cap detachably secured in said recess and interengaging said outer race to hold the fixed relation to said seat, a handle extending radially away from said housing, and a fluid inlet passageway in said handle communicating with the interior of said housing to direct a jet of fluid tangentially against said rotor.

23. A dental handpiece according to claim 22 further comprising a fluid exhaust passage means in said handle communicating with the interior of said housing at a location adjacent said inlet for discharging fluid after it has traveled from said inlet and around said housing.

24. A dental handpiece according to claim 23 further comprising means forming fluid outlets in said cap and in the end of said housing opposite said cap for exhausting fluid through said bearings.

25. A high speed fluid driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a vaned rotor having a spindle at one end frictionally and slidably engaging the inner race of said lower bearing for rotation therewith, an upper radial bearing having its inner race fixed to the other end of said rotor and the outer race thereof interengaging a seat in said recess, a cap detachably secured in said recess and interengaging said outer race to hold the same in fixed relation to said seat, and means forming exhaust outlets in said cap and in said housing opposite said cap for exhausting fluid through said bearings.

26. A high speed driven dental handpiece comprising, a housing having a substantially cylindrical recess therein, a lower radial bearing seated in the bottom of said recess, a washer secured in said recess immediately above said bearing and locking the outer race of said bearing against the bottom of said recess, a vaned rotor having a spindle at one end frictionally and slidably engaging the inner race of said lower bearing for rotation therewith, an upper radial having its inner race fixed to the other end of said rotor and the outer race thereof interengaging a seat in said recess, a cap detachably secured in said recess and interengaging said outer race to hold the same fixed relative to said seat, a hollow handle extending radially away from said housing, a fluid inlet tube in said handle communicating with the interior of said housing to direct a jet of fluid tangentially against said rotor, said housing having an outlet adjacent said inlet and communicating with the interior of said handle, and means located in said handle, remote from said outlet, restricting the flow of fluid out of said handle to create positive internal pressure in said housing.

27. A high speed dental handpiece operated by a fluid driven rotary motor comprising, a housing having a cylinrical bore, a rotor concentrically mounted in said bore, bearings at opposite ends of said rotor supporting said rotor in said bore and having passages therethrough in an axial direction, said housing being mounted on one end of a handle, a fluid inlet passageway in said handle for directing a jet of fluid against said rotor to drive the same, an exhaust passageway in said handle, and means constricting said exhaust passageway to create a pressure in excess of atmospheric within said housing, said constricting means comprising a block in said exhaust passageway, said block having a hole therethrough, and a spring biased check ball in said hole to form automatic regulation of said pressure within said housing.

28. A dental handpiece according to claim 27 further comprising means for varying the pressure of said spring against said ball.

[29. A dental handpiece having a handle provided with fluid inlet conduit means carried thereby so as to be movable therewith at all times and extending longitudinally thereof and connectable at one end to a source of fluid under pressure, said handle also having fluid exhaust conduit means extending therealong and carried thereby so as to be movable therewith at all times; a turbine unit assembly having, a rotor and shaft arranged to be driven by fluid under pressure, bearing means for said rotor spaced longitudinally thereof, and means surrounding said rotor and having fluid inlet and outlet means therein providing communication with said rotor, said shaft having means to which a tool may be attached; and means detachably securing said turbine unit relative to one end of said handle to maintain said fluid inlet and outlet means of said rotor surrounding means of said turbine unit in registering communication respectively with said fluid inlet and exhaust conduit means of said handle to receive fluid therefrom to drive said rotor and exhaust fluid from said unit, whereby when said handle is detached from said turbine unit assembly, said fluid inlet and exhaust conduit means will be simultaneously detached from said fluid inlet and outlet means.]

[30. A dental handpiece having a handle provided with fluid inlet and outlet conduit means extending therethrough and said inlet conduit means being connectable at one end to a source of fluid under pressure and the other end thereof being fixedly connected to said handle adjacent one end thereof for movement with said handle at all times; a turbine unit assembly having a combination, a rotor having impeller means in the outer periphery thereof and a shaft arranged to be driven by fluid under pressure, bearing means for said rotor shaft spaced longitudinally of said shaft, and means positioned exteriorly of said impeller means of said rotor and extending longitudinally between said bearings to space the same and having fluid inlet and outlet means extending transversely therethrough and providing communication with the impeller means of said rotor, said shaft having means to which a tool may be attached; and means detachably securing said turbine unit assembly relative to said one end of said handle to maintain said fluid inlet and outlet means of said exteriorly positioned means of said turbine unit in registering communication respectively with said fluid inlet and outlet conduit means of said handle to transmit fluid to and from said rotor to drive the same, whereby when said handle is detached from said turbine unit assembly said fluid inlet and exhaust conduit means will be simultaneously detached from said fluid inlet and outlet means.]

[31. A dental handpiece having a handle provided with fluid exhaust conduit means and rigid fluid inlet conduit means, both of said means extending therealong and fixed thereto so as to be movable therewith at all times, said fluid inlet conduit means being connectable to a source of fluid under pressure; a turbine unit comprising in combination a rotor having impeller means on the outer periphery thereof and a shaft arranged to be driven by fluid under pressure, bearing means for said rotor shaft spaced longitudinally therealong, and means surrounding said rotor and having fluid inlet and outlet means extending transversely therethrough and communicating with said rotor, said shaft having means to which a tool may be attached; and means detachably securing said turbine unit relative to one end of said handle to maintain the fluid inlet and outlet means of said rotor surrounding means of said turbine unit in registering communication respectively with said fluid inlet and exhaust conduit means of said handle to receive fluid therefrom to drive said rotor and exhaust fluid from said turbine unit, whereby when said handle is detached from said turbine unit assembly said fluid inlet and exhaust conduit means to be simultaneously detached from said fluid inlet and outlet means.]

[32. A dental handpiece having a handle provided with conduit means extending longitudinally thereof and connectable at one end to a source of fluid under pressure, a housing head connected to the other end of said handle and having an opening therein, a cartridge comprising; a turbine rotor and shaft, bearings spaced axially of said shaft and supporting the same for rotation, and means surrounding said shaft and extending between said bearings to space the same in an axial direction, said last mentioned means having fluid inlet means communicating with said rotor and said rotor also having means to which a tool may be attached, said cartridge being inserted through said opening in said head into operative position therein; and means detachably connected to said head and engaging said cartridge to secure the same within said head with said fluid inlet means in said cartridge in communication with said fluid conduit means of said handle.]

33. A dental handpiece having a handle provided with conduit means extending longitudinally thereof and connectable at one end to a source of fluid under pressure, a housing head connected to the other end of said handle and having an opening at the upper end thereof and an aperture on the lower end thereof, a cartridge comprising a casing surrounding a turbine rotor arranged to be driven by fluid under pressure and having one end projecting axially beyond one end of said casing to engage a dental tool, said cartridge casing having fluid inlet means communicating with said rotor, said cartridge being inserted through said opening in the upper end of said head into operative position therein wherein the projecting end of said rotor extends through said aperture in said head, and means detachably connected to the upper end of said head to engage and secure said cartridge within said head with fluid inlet means in the casing thereof in communication with said fluid conduit means of said handle to receive fluid therefrom to drive said rotor.

[34. A dental handpiece having a handle provided with conduit means extending longitudinally thereof and connectable at one end to a source of fluid under pressure, a housing head connected to the other end of said handle and having an opening therein, a cartridge comprising a casing surrounding a turbine rotor arranged to be driven by fluid under pressure and bearings adjacent opposite ends of said casing supporting said rotor, said cartridge casing having fluid inlet means communicating with said rotor and said rotor also having means to which a tool may be attached, said cartridge being inserted through said opening in said head into operative position therein, and securing means detachably connected to said head relative to said opening therein and engaging said cartridge within said head to hold the same therein with the fluid inlet means therein in communication with said fluid conduit means of said handle to receive fluid therefrom to drive said rotor.]

[35. A dental handpiece having a handle provided with conduit means extending longitudinally thereof and connectable at one end to a source of fluid under pressure, a housing head connected to the other end of said handle and having an opening at the upper end thereof, a cartridge comprising a casing surrounding a turbine rotor arranged to be driven by fluid under pressure and bearings seated relative to opposite ends of said casing and, supporting said rotor, said cartridge having fluid inlet means communicating with said rotor and said rotor also having means to which a tool may be attached, said cartridge being inserted through said opening in the upper end of said head into operative position therein, and a cap detachably connected to the upper end of said head to close said opening therein and secure said cartridge within said head with the fluid inlet therein in communication with said fluid conduit means of said handle to receive fluid therefrom to drive said rotor and also maintain said bearings seated relative to said casing of said cartridge.]

36. A dental handpiece having a handle provided with conduit means extending longitudinally thereof and connectable at one end to a source of fluid under pressure, a housing head connected to the other end of said handle and having an opening therein, a cartridge comprising a turbine rotor and shaft arranged to be driven by fluid under pressure, said cartridge having fluid inlet means communicating with said rotor and said rotor also having means to which a tool may be attached, said cartridge being inserted through said opening into operative position therein, and co-engaging indexing means on said cartridge and head operable to align the fluid inlet means of said cartridge in communication with said fluid conduit means of said handle to receive fluid therefrom to drive said rotor.

[37. A dental handpiece having a hollow handle provided with conduit means extending longitudinally thereof and connectable at one end to a source of fluid under pressure, a housing head connected to the other end of said handle and having an opening therein, and a cartridge comprising a turbine rotor arranged to be driven by fluid under pressure, said cartridge having fluid inlet means and outlet means communicating with said rotor and said rotor also having means to which a tool may be attached, said cartridge being inserted through said opening into operative position with said head with the fluid inlet means therein in communication with said fluid conduit means of said handle to receive fluid therefrom to drive said rotor and the fluid outlet means of said cartridge in communication with the hollow handle to permit discharge of fluid from said cartridge through said handle.]

[38. A dental handpiece having a hollow handle provided with conduit means extending longitudinally thereof and connectable at one end to a source of fluid under pressure, a housing having an opening at the upper end thereof and connected to the other end of said handle, a cartridge comprising a casing surrounding a turbine rotor arranged to be driven by fluid under pressure and having one end arranged to engage a dental tool, said cartridge casing having fluid inlet and outlet means therein communicating with said rotor, said cartridge being inserted through said opening in the upper end of said head into operative position therein, and means detachably connected to the upper end of said head to secure said cartridge within said head with the fluid inlet means in the casing thereof in communication with said fluid conduit means of said handle to receive fluid therefrom to drive said rotor and the fluid outlet means of said casing in communication with the hollow handle to permit discharge of fluid from said cartridge through said handle.]

39. A dental handpiece comprising a head, a turbine rotor and shaft supported for rotation within said head, means to rotate said rotor, said shaft having an opening extending axially therethrough to receive in one end of said opening the shank of a dental tool for rotation by said rotor, and means on one end of said head extending over the other end of shaft, said means having a hole therein in axial alignment with the opening in said shaft, whereby an elongated member may be inserted through said hole and opening in said shaft from the end thereof opposite that into which a shank of a bur is inserted, thereby to push a bur or broken part thereof from said shaft.

40. A dental handpiece comprising, in combination, a handle provided on one end with a housing connected thereto and having an opening therein, said handle having fluid passage means therethrough communicating with the interior of said housing; and a fluid operated rotor cartridge assembly comprising a turbine rotor having vanes intermediate of the ends thereof, antifriction bearings having inner and outer races, said inner races receiving respectively the opposite ends of said rotor, and means extending between said outer races of said bearings and engaging the same to maintain said outer races spaced axially a precise predetermined distance, said cartridge assembly being removably positioned within said housing as a unit by insertion thereof through said opening.

41. A dental handpiece comprising in combination, a handle provided on one end with a housing connected thereto and having an opening therein, said handle having fluid passage means therein communicating with the interior of said housing; and a fluid operated rotor cartridge assembly comprising a turbine rotor having vanes intermediate of the ends thereof, anti-friction bearings having inner and outer races, said inner races receiving respectively the opposite ends of said rotor, and means surrounding said rotor and extending axially between the outer races of said bearings and engaging the same to maintain said outer races spaced axially a precise predetermined distance, said surrounding means having ports communicating with the fluid passage means of said handle and said rotor cartridge assembly being removably positioned within said housing as a unit by insertion thereof through said opening.

42. The dental handpiece according to claim 41 further including interengageable indexing means on said rotor cartridge unit and housing operable to maintain the ports in said surrounding means aligned with the fluid passage means of said handle, whereby fluid from said passage means is directed against the vanes of said rotor to actuate it.

43. A dental handpiece comprising in combination, a handle having a housing on one end thereof connected thereto and provided with an opening therein; a fluid operated turbine motor cartridge assembly comprising a fluid operated turbine rotor having vanes intermediate the ends thereof, anti-friction bearings having inner and outer races, the inner races thereof receiving said rotor adjacent the opposite ends thereof, a casing surrounding the vanes of said rotor and the opposite ends of said casing interengaging the outer races of said bearings to position them axially spaced precisely a predetermined distance, said cartridge assembly being removably positioned within said housing as a unit and said casing preventing abnormal loading of said bearings when said cartridge assembly is so mounted; and means connectable with said housing and engaging said cartridge assembly to retain the same therein.

44. A dental handpiece comprising in combination, a handle having a housing on one end thereof connected thereto and provided with an opening therein, said housing having a seat in one end; a fluid operated turbine rotor cartridge assembly comprising a fluid operated turbine having vanes intermediate the ends thereof, anti-friction bearings comprising inner and outer races mounted at opposite ends of said rotor, the inner races of said bearings receiving said rotor, means extending between the outer races of said bearings and operable to maintain the same in precise spaced position axially, the outer race of the lower bearing being received within said seat in said housing unit when said rotor assembly is inserted into said housing through said opening therein; and cap means connectable with said housing over said opening therein and engageable with said outer cartridge assembly to hold the outer races of said bearings stationary relative to said housing and said assembly seated therein.

45. A dental handpiece comprising in combination, a handle having a housing on one end thereof connected thereto and provided with an opening therein; a fluid operated turbine rotor cartridge assembly comprising a fluid operated turbine having vanes intermediate of the ends thereof, anti-friction bearing units having inner and outer races and anti-friction members therebetween, the outer races of said bearing units having radial flanges projecting outwardly from the inner ends of said races and the inner races of said units respectively receiving concentrically the opposite ends of said rotor, a casing complementary to the interior of said housing and surrounding the vanes of said rotor, the opposite ends of said casing respectively abutting radial faces of said flanges of said outer races of said bearing units to space said outer races a precise predetermined distance axially and said cartridge assembly being removably mounted operatively within said housing and positionable therein as a unit by insertion thereof through said opening; and cap means for the opening of said housing releasably secured thereto and having a portion engaging the outer race of the upper bearing unit of said cartridge assembly to secure said outer races of said bearings against said ends of said casing and said cartridge assembly in operative position within said housing when said cap is secured to said housing.

46. The dental handpiece set forth in claim 45 further characterized by the diameter of the periphery of said flanges and exterior of said casing being substantially even and only slightly less than the diameter of the interior of said housing which receives said turbine cartridge assembly, whereby the inner wall of said housing maintains said outer races of said bearing units and casing substantially in axial alignment when said turbine cartridge assembly is mounted within said housing.

[47. A dental handpiece having a handle provided with conduit means extending longitudinally thereof and connectable at one end to a source of fluid under pressure, a substantially cylindrical housing head connected to the outer end of said handle with the axis of the head substantially vertical to said handle and said head having an opening in one end thereof, a cartridge comprising a turbine rotor and shaft, bearings spaced axially of said shaft and supporting the same for rotation, and means surrounding said shaft and extending between said bearings to space the same in an axial direction, said rotor having means to which a tool may be attached and said cartridge having fluid inlet means and being removably inserted into said opening in said head to operatively position the same therein; and means detachably connecting said cartridge to said head to secure at least a portion of said cartridge within said head with said fluid inlet means of said cartridge in communication with said fluid conduit means of said handle.]

48. A dental handpiece comprising in combination, a handle having fluid passage means therein and a housing on one end thereof connected thereto and provided with an opening therein, said housing having a seat in one end thereof; a fluid operated turbine rotor cartridge assembly comprising a fluid operated turbine having vanes intermediate the ends thereof; anti-friction bearings comprising inner and outer races mounted at opposite ends of said rotor, the inner races of said bearings receiving said rotor adjacent opposite ends thereof, means extending between the outer races of said bearings and surrounding said rotor vanes, said means being operable to maintain said outer races in precise spaced position axially and having fluid ports therein aligned with the passage means in said handle, the outer race of the lower bearing being received within said seat in said housing when said rotor cartridge assembly is inserted into said housing through said opening therein; interengaging means on said rotor cartridge assembly and housing and operable to prevent relative rotary movement therebetween and maintain the ports therein aligned with the passage means in said handle; and means connectable with said housing relative to said opening therein and engageable with said rotor cartridge assembly and operable to hold the outer races of said bearings stationary relative to said housing and said cartridge assembly seated therein.

49. A dental handpiece comprising in combination, a handle having a housing on one end thereof connected thereto and provided with an opening; a fluid operated turbine rotor cartridge assembly comprising a fluid operated turbine having shaft ends and vanes intermediate the ends thereof, anti-friction bearing units each comprising concentric inner and outer races having radially opposed raceways and anti-friction bearing members positioned with limited clearance between said raceways to afford corresponding radial movement between said races of each bearing unit, a casing surrounding the vanes of said rotor and the opposite ends of said casing interengaging in an axial direction the outer races of said bearing units in operative position to space the same axially precisely, the inner races of said bearing units being connected frictionally to the opposite shaft ends of said rotor and thereby maintained spaced axially a predetermined amount whereby when said opposite ends of said casing interengage said outer races said raceways in said bearing units will be in precise radial opposition and thereby permit the aforementioned limited radial movement between the races of each bearing unit to be effective, said cartridge assembly being removably positioned within said housing as a unit by insertion thereof through said openin therein; and means in opposite ends of said housing interengageable with said outer races of said bearing units to hold the same in operative position relative to the opposite ends of said casing, whereby said inner and outer races of said bearing units are positioned in use respectively spaced precise predetermined distances axially to prevent abnormal loading of said bearing units.

50. A dental handpiece comprising in combination, a handle having a housing on one end thereof connected thereto and provided with an opening; a fluid operated turbine rotor cartridge assembly comprising a fluid operated turbine having shaft ends and vanes intermediate thereof, anti-friction bearing units each comprising concentric inner and outer races having radially opposed raceways and anti-friction bearing members positioned with limited clearance between said raceways to afford corresponding radial movement between said races of each bearing unit, a casing surrounding the vanes of said rotor and the opposite ends of said casing interengaging respectively the opposed inner faces on the outer races of said bearing units in operative position to space the same precisely a predetermined distance axially, the inner races of said bearing units being connected frictionally to the opposite shaft ends of said rotor and thereby maintained spaced axially a predetermined amount whereby when said opposite ends of said casing engage the inner end faces of said outer races said raceways in said bearing units will be in precise opposition and thereby permit the aforementioned limited radial movement between the races of each bearing unit to be effective, said cartridge assembly being removably positioned within said housing as a unit by insertion thereof through said opening; and means in opposite ends of said housing interengageable with said outer races of said bearings to hold the same in operative position relative to the opposite ends of said casing, whereby said inner and outer races of said bearing units are positioned in use respectively spaced precise predetermined distances axially to prevent abnormal loading of said bearing units.

51. A dental handpiece comprising in combination, a handle having a housing on one end thereof connected thereto and provided with an opening therein, said housing having a seat in one end thereof; a fluid operated turbine rotor cartridge assembly comprising a fluid operated turbine having vanes intermediate the ends thereof, anti-friction bearings comprising inner and outer races mounted at opposite ends of said rotor, the inner races of said bearings receiving said rotor, a clamping ring surrounding and positioning the outer race of the normally upper bearing in use, means extending between said clamping ring and outer race of the normally lower bearing in use and operable to space the outer races of said bearings a precise distance axially, the outer race of the lower bearing also being received within said seat in said housing, and cap means connectable to said housing over said opening therein and engageable with the upper end of said clamping ring to hold the outer races of said bearings firmly positioned and stationary relative to the opposite ends of said casing and the seat within said housing.

52. A dental handpiece comprising in combination, a handle having a housing on one end thereof connected thereto and provided with an opening therein, said housing having a seat in one end thereof, a fluid operated turbine rotor cartridge assembly comprising a fluid operated turbine having vanes intermediate the ends thereof, anti-friction bearings comprising inner and outer races mounted at opposite ends of said rotor, the inner races of said bearings being fixed to said rotor, a clamping ring surrounding and positioning the outer race of the normally upper bearing in use, means extending between and abutting the outer race of the normally lower bearing in use and the lower surface of said clamping ring and operable to space the outer races of said bearings a precise distance axially, the outer race of the lower bearing being received within said seat in said housing; and cap means connectable to said housing over said opening therein and engageable with the upper end of said clamping ring to hold the outer races of said bearings stationary relative to said housing and said cartridge assembly seated therein.

53. The dental handpiece according to claim 52 further characterized by said spacing means comprising a casing having an inwardly extending flange on the lower end thereof engageable with the upper surface of the outer race of the lower bearing, whereby said cap forces said clamping ring against the upper end of said casing and the flange on said casing forces the outer race of the lower bearing against the seat therefor in said housing when said cap is connected to said housing.

54. The dental handpiece according to claim 51 further characterized by said spacing means comprising a casing surrounding the vanes of said rotor and having port means therein in alignment with the fluid passage means in the handle of said handpiece, whereby fluid is directed to said rotor to actuate it, and interengaging indexing means on said casing and housing operable to establish alignment of said ports in said casing with the fluid passage means of said handle when said rotor assembly is inserted within said housing.

55. A dental handpiece comprising in combination, a handle having a housing on one end thereof connected thereto and provided with an opening therein; a fluid operated turbine rotor cartridge assembly comprising a fluid operated turbine having vanes intermediate the ends thereof; anti-friction bearings comprising inner and outer races mounted at opposite ends of said rotor, the inner races of said bearings receiving said rotor, clamping rings respectively surrounding and positioning the outer races of said bearings relative to said housing, and means extending between said clamping rings and operable to space the same and the outer races of said bearings a precise distance axially, said cartridge assembly being removably positioned with said housing as a unit by insertion thereof through said opening.

56. A dental handpiece comprising in combination, a handle having a housing on one end thereof connected thereto and provided with an opening therein, said housing having a seat in one end thereof; a fluid operated turbine rotor cartridge assembly comprising a fluid operated turbine having vanes intermediate the ends thereof, anti-friction bearings comprising inner and outer races mounted at opposite ends of said rotor, the inner races of said bearings receiving said rotor, clamping rings respectively surrounding and positioning the outer races of said bearings relative to said housing, means extending between said clamping rings and operable to space the same and the outer races of said bearings a precise distance axially, the clamping ring on the outer race of the normally lower bearing in use being received within said seat in said housing; and cap means connectable to said housing relative to said opening and engageable with the clamping ring on the normally upper race in use to hold said assembly pressed against said seat in the housing and the outer races of said bearing stationary relative to said housing.

57. A dental handpiece comprising in combination, a handle having a housing on one end thereof connected thereto and having a cylindrical interior wall and an opening therein, said housing having a seat in one end; a fluid operated turbine rotor cartridge assembly comprising a fluid operated turbine having vanes intemediate the ends thereof, anti-friction bearings comprising inner and outer races mounted at opposite ends of said rotor, the inner races of said bearings being fixed to said rotor, clamping rings respectively surrounding and fixed to the outer races of said bearings, a cylindrical casing extending between and abutting the inner end faces of said clamping rings and operable to space the same and the outer races of said bearings a precise distance axially, the outer diameters of the clamping rings on the outer races of the bearings being substantially the same as the outer diameter of said casing and said diameters being slightly less than the diameter of the cylindrical interior of said housing, whereby said turbine rotor cartridge assembly may be inserted into said housing through said opening to be positioned operatively therein, whereby said clamping rings and bearings are held coaxially aligned with said casing and said rotor cartridge assembly is centered relative to said housing; and locking means engageable with the clamping ring on the normally upper race in use to hold said cartridge assembly pressed against said seat in the housing and the outer races of said bearings stationary relative to said housing.

58. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof receiving respectively the said rotor adjacent the outer ends thereof, means extending between said bearings and the opposite end portions of said means directly and respectively engaging the outer races of said bearings to space the same axially a predetermined precise distance, said cartridge assembly being removably positioned within said housing as a unit by insertion thereof through said opening; and means operable to secure said assembly in operative position within said housing.

59. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof receiving respectively the opposite ends of said rotor, a casing surrounding the vanes of said rotor, the opposite end portions of said casing being substantially identical and directly respectively engaging the outer races of said bearings to space the same axially a predetermined precise distance, said cartridge assembly being removably positioned within said housing as a unit by insertion thereof through said opening; and means operable to secure said assembly in operative position within said housing.

60. A dental handpiece comprising in combination, a handle having a housing on one end thereof connected thereto and provided with an opening therein; a fluid operated turbine rotor cartridge assembly comprising a fluid operated turbine having vanes intermediately of the ends thereof, anti-friction bearings having inner and outer races, the inner races thereof being connected respectively to the opposite ends of said rotor, a casing surrounding the vanes of said rotor and extending between said bearings, the opposite end portions of said casing respectively directly abutting the opposed faces of the outer races of said bearings to space the same axially a predetermined precise distance, said cartridge assembly being removably positioned within said housing as a unit by insertion thereof through said opening; and means operable to secure said assembly in operative position within said housing.

61. A dental handpiece comprising a hollow handle having a rotor housing at one end and connected thereto, a gaseous fluid operated rotor supported for rotation within said housing, gaseous fluid conducting means within said handle operable to direct gaseous fluid to said rotor to rotate the same, means to discharge gaseous fluid from said housing into said handle, and filter means within said handle to filter said exhausting gaseous fluid discharged from said handle.

62. A high speed fluid operated rotary unit comprising supporting means, conduit means connectable to a source of fluid under pressure, a housing head connected to said supporting means and having an opening, a cartridge comprising a turbine rotor arranged to be driven by fluid under pressure and having fluid inlet means communicating with said rotor and said rotor also having means engageable with material to be worked thereby, said cartridge being insertable through said opening into operative position within said head, and co-engaging indexing means on said cartridge and conduit means operable to align the fluid inlet means of said cartridge in communication with said fluid conduit means to receive fluid therefrom to drive said rotor.

63. A high speed fluid operated rotary unit comprising supporting means provided with conduit means connectable to a source of fluid under pressure, a housing head connected to said supporting means and having an opening, a cartridge comprising a turbine rotor arranged to be driven by fluid under pressure, said cartridge having fluid inlet means communicating with said rotor and said rotor also having means engageable with material to be worked, said cartridge being insertable through said opening into operative position within said head, and co-engaging indexing means on said cartridge and head operable to align the fluid inlet means of said cartridge in communication with said fluid conduit means of said supporting means to receive fluid therefrom to drive said rotor.

[64. A high speed rotary tool comprising a supporting member provided with conduit means connectable to a source of fluid under pressure, a housing connected to said supporting means and having an opening therein, a cartridge unit comprising; a turbine rotor and shaft to be driven by fluid under pressure, bearings spaced axially of said shaft and supporting the same for rotation, and means surrounding said shaft and extending between said bearings to space the same in an axial direction, said last mentioned means having fluid inlet means communicating with said rotor and said rotor also having means to which a tool may be attached, said cartridge being insertable through said opening in said housing into operative position therein; and means detachably connected to said head and engaging said cartridge to secure said cartridge within said housing with the fluid inlet means therein in communication with said fluid conduit means of said supporting member to receive fluid therefrom to drive said rotor.]

65. A high speed rotary tool comprising a supporting member provided with conduit means connectable to a source of fluid under pressure, a housing having an opening therein, a cartridge comprising; a turbine rotor and shaft to be driven by fluid under pressure, bearings spaced axially of said shaft and supporting the same for rotation, and means surrounding said shaft and extending between said bearings to space the same in an axial direction, said last mentioned means having fluid inlet means communicating with said rotor and said rotor also having means to which a tool may be attached, said cartridge being insertable through said opening of said housing into operative position therein, co-engaging indexing means on said cartridge and housing operable to align the fluid inlet means of said cartridge in communication with said fluid conduit means of said supporting member to receive fluid therefrom to drive said rotor; and means detachably connected to said housing and engaging said cartridge to secure said cartridge therein.

66. A high speed dental handpiece comprising a housing having opposite ends and a chamber therein, a shaft within said housing, a rotor having impeller means carried by said shaft and positioned within said chamber with its ends in spaced relationship to the opposite ends of said chamber to provide annular expansion and distribution pockets in the opposite ends of said chamber, bearings supported by said housing for rotatable supporting said shaft outwardly from opposite ends of said rotor, means on one end of said shaft to connect a dental tool thereto, said impeller means on said rotor including means adjacent the ends thereof operable to discharge gas freely from said impeller means axially in opposite directions substantially from locations beteen the periphery and axis of said rotor for expansion and circulation into said pockets, said opposite ends of the housing being provided with gas discharge means positioned axially past said bearings and communicating with said pockets for exhausting a portion of said driving gas from said chamber, and an additional gas discharge means communicating at one end with said chamber and at the other end being directed to the atmosphere at a position remote from said housing.

67. A high speed dental handpiece comprising a housing having opposite ends and a chamber therein intermediate the ends thereof, a shaft within said housing, a rotor having impeller means carried by said shaft and positioned within said chamber, bearings supported by said housing for rotatably supporting said shaft outwardly from opposite ends of said rotor, means on one end of said shaft to connect a dental tool thereto, means to direct gas under pressure against said impeller means to rotate said rotor, said impeller means on said rotor including means adjacent the ends thereof operable to discharge gas from said impeller means axially in opposite directions into said chamber, said housing having annular spaces respectively adjacent said opposite ends of said housing and communicating with said intermediate chamber, said opposite ends of the housing also being provided with gas discharge means positioned axially past said bearings and communicating with said annular spaces to exhaust therefrom a portion of said driving gas, and an additional gas discharge means communicating at one end with said intermediate chamber and at the other end being directed to the atmosphere at a position remote from said housing.

* * * * *